(12) United States Patent
Hsu et al.

(10) Patent No.: US 9,075,221 B2
(45) Date of Patent: Jul. 7, 2015

(54) OPTICAL IMAGING LENS AND ELECTRONIC DEVICE COMPRISING THE SAME

(71) Applicants: Sheng-Wei Hsu, Taichung (TW); Tzu-Chien Tang, Taichung (TW)

(72) Inventors: Sheng-Wei Hsu, Taichung (TW); Tzu-Chien Tang, Taichung (TW)

(73) Assignee: Genius Electronic Optical Co., Ltd., Central Taiwan Science Park, Daya District, Tiachung (TW)

( * ) Notice: Subject to any disclaimer, the term of this patent is extended or adjusted under 35 U.S.C. 154(b) by 0 days.

(21) Appl. No.: 14/105,193

(22) Filed: Dec. 13, 2013

(65) Prior Publication Data

US 2015/0036044 A1 Feb. 5, 2015

(30) Foreign Application Priority Data

Aug. 2, 2013 (TW) .............................. 102127841 A

(51) Int. Cl.
| | |
|---|---|
| *G02B 3/02* | (2006.01) |
| *G02B 13/18* | (2006.01) |
| *G02B 9/60* | (2006.01) |
| *H04N 5/225* | (2006.01) |
| *G02B 13/00* | (2006.01) |

(52) U.S. Cl.
CPC ................ *G02B 9/60* (2013.01); *H04N 5/2252* (2013.01); *G02B 13/0045* (2013.01)

(58) Field of Classification Search
CPC ....... G02B 9/60; G02B 13/0045; G02B 13/18
USPC ................................................. 359/714, 763
See application file for complete search history.

(56) References Cited

U.S. PATENT DOCUMENTS

| | | | |
|---|---|---|---|
| 7,502,181 | B2 | 3/2009 | Shinohara |
| 7,538,958 | B2 | 5/2009 | Tang |
| 7,826,151 | B2 | 11/2010 | Tsai |
| 8,363,337 | B2 | 1/2013 | Tang |
| 8,369,029 | B2 | 2/2013 | Tang |
| 8,422,145 | B2 | 4/2013 | Ise |
| 2012/0194920 | A1 | 8/2012 | Huang |
| 2013/0010374 | A1 | 1/2013 | Hsieh |
| 2013/0021680 | A1 | 1/2013 | Chen |

FOREIGN PATENT DOCUMENTS

| | | |
|---|---|---|
| CN | 202837661 U | 3/2013 |
| JP | 2007279282 | 10/2007 |
| JP | 2010224521 | 10/2010 |
| JP | 2011164562 | 8/2011 |
| JP | 4858648 | 1/2012 |
| TW | 201144890 | 12/2011 |
| TW | 201227044 | 7/2012 |
| TW | 201239444 | 10/2012 |
| TW | 201245758 | 11/2012 |
| TW | 201317618 | 5/2013 |

*Primary Examiner* — William Choi
(74) *Attorney, Agent, or Firm* — Winton Hsu; Scott Margo

(57) ABSTRACT

An optical imaging lens set includes: a first lens element, an aperture stop, a second lens element, a third lens element, a fourth lens element and a fifth lens element, the first lens element with refractive power having a convex object-side surface and an image-side surface with a concave part in a vicinity of its periphery, the second lens element with refractive power having an object-side surface with a convex part in a vicinity of its periphery, the third lens element with refractive power having an object-side surface with a concave part in a vicinity of its periphery, the fourth lens element with refractive power, the fifth lens element with refractive power having an image-side surface with a concave part in a vicinity of the optical axis.

15 Claims, 31 Drawing Sheets

First Example

F= 2.709 mm, HFOV= 46.873 deg., Fno= 2.40

| No. | | Curvature Radius | Ape. Stop Distance Lens Thickness Air Gap | Refractive Index | Abbe No. | Focal Length | Material |
|---|---|---|---|---|---|---|---|
| | Object | Infinite | 600 | | | | |
| 11 | First Lens | 2.713 | 0.288 | 1.645 | 23.265 | -39.459 | Plastic |
| 12 | | 2.350 | 0.263 | | | | |
| 80 | Ape. Stop | Infinite | -0.086 | | | | |
| 21 | Second Lens | 1.608 | 0.384 | 1.546 | 56.114 | 2.674 | Plastic |
| 22 | | -14.517 | 0.474 | | | | |
| 31 | Third Lens | -3.748 | 0.250 | 1.645 | 23.265 | -4.686 | Plastic |
| 32 | | 15.968 | 0.183 | | | | |
| 41 | Fourth Lens | -3.444 | 0.799 | 1.546 | 56.114 | 1.427 | Plastic |
| 42 | | -0.687 | 0.101 | | | | |
| 51 | Fifth Lens | 3.240 | 0.452 | 1.536 | 56.273 | -1.677 | Plastic |
| 52 | | 0.670 | 0.541 | | | | |
| 60 | IR Filter | Infinite | 0.210 | | | | |
| | IR Filter-Image Plane | Infinite | 0.337 | | | | |
| 71 | Image Plane | Infinite | 0.012 | | | | |

FIG. 22

| No. | 11 | 12 | 21 | 22 | 31 |
|---|---|---|---|---|---|
| K | -1.85E+01 | -5.00E+01 | -2.72E+01 | 0.00E+00 | -9.77E+00 |
| a4 | 3.13E-03 | 2.92E-01 | 7.11E-01 | -6.58E-02 | -6.15E-01 |
| a6 | -7.46E-02 | -1.26E+00 | -2.28E+00 | -2.36E-01 | 1.29E-01 |
| a8 | -1.15E-02 | 3.24E+00 | 5.22E+00 | 5.56E-01 | 2.17E-02 |
| a10 | 1.05E-01 | -5.23E+00 | -6.05E+00 | -1.43E+00 | -3.06E+00 |
| a12 | -4.71E-02 | 5.05E+00 | 1.89E+00 | 1.14E+00 | 4.30E+00 |
| a14 | 4.61E-04 | -1.99E+00 | | -5.19E-04 | |
| a16 | | | | -2.38E-03 | |

| No. | 32 | 41 | 42 | 51 | 52 |
|---|---|---|---|---|---|
| K | 0.00E+00 | 2.47E+00 | -2.98E+00 | -1.29E+01 | -4.11E+00 |
| a4 | -5.62E-01 | -2.60E-01 | -2.57E-01 | -1.55E-01 | -1.14E-01 |
| a6 | 1.09E+00 | 6.58E-01 | 1.98E-03 | 2.81E-02 | 6.32E-02 |
| a8 | -3.26E+00 | -2.13E+00 | 4.35E-01 | 5.52E-02 | -2.48E-02 |
| a10 | 7.52E+00 | 4.36E+00 | -1.01E+00 | -5.01E-02 | 6.53E-03 |
| a12 | -1.15E+01 | -4.50E+00 | 1.08E+00 | 2.01E-02 | -1.11E-03 |
| a14 | 1.16E+01 | 2.30E+00 | -5.11E-01 | -4.33E-03 | 1.06E-04 |
| a16 | -6.66E+00 | -4.77E-01 | 8.70E-02 | 4.89E-04 | -4.29E-06 |
| a18 | 1.64E+00 | | | -2.28E-05 | |

FIG. 23

Second Example

F= 2.78 mm, HFOV= 46.873 deg., Fno= 2.4

| No. | | Curvature Radius | Ape. Stop Distance Lens Thickness Air Gap | Refractive Index | Abbe No. | Focal Length | Material |
|---|---|---|---|---|---|---|---|
| | Object | Infinite | 600 | | | | |
| 11 | First Lens | 3.000 | 0.250 | 1.645 | 23.265 | -20.755 | Plastic |
| 12 | | 2.370 | 0.177 | | | | |
| 80 | Ape. Stop | Infinite | -0.098 | | | | |
| 21 | Second Lens | 1.553 | 0.528 | 1.546 | 56.114 | 2.616 | Plastic |
| 22 | | -15.688 | 0.466 | | | | |
| 31 | Third Lens | -3.957 | 0.250 | 1.645 | 23.265 | -3.234 | Plastic |
| 32 | | 4.516 | 0.094 | | | | |
| 41 | Fourth Lens | -22.308 | 1.053 | 1.546 | 56.114 | 1.259 | Plastic |
| 42 | | -0.678 | 0.190 | | | | |
| 51 | Fifth Lens | 7.164 | 0.389 | 1.536 | 56.273 | -1.472 | Plastic |
| 52 | | 0.698 | 0.560 | | | | |
| 60 | IR Filter | Infinite | 0.210 | | | | |
| | IR Filter-Image Plane | Infinite | 0.276 | | | | |
| 71 | Image Plane | Infinite | 0.009 | | | | |

FIG. 24

| No. | 11 | 12 | 21 | 22 | 31 |
|---|---|---|---|---|---|
| K | -1.85E+01 | -5.00E+01 | -2.72E+01 | 0.00E+00 | -6.85E+00 |
| a4 | -3.45E-03 | 3.01E-01 | 8.01E-01 | -7.45E-02 | -7.19E-01 |
| a6 | -5.60E-02 | -1.22E+00 | -3.01E+00 | -2.19E-01 | 8.00E-01 |
| a8 | -5.30E-04 | 3.32E+00 | 9.34E+00 | 1.41E+00 | -2.51E+00 |
| a10 | 9.78E-02 | -5.32E+00 | -1.67E+01 | -7.18E+00 | 1.67E+00 |
| a12 | -3.93E-02 | 5.07E+00 | 1.29E+01 | 1.98E+01 | 9.23E-01 |
| a14 | -1.58E-02 | -1.99E+00 | | -2.87E+01 | |
| a16 | | | | 1.82E+01 | |

| No. | 32 | 41 | 42 | 51 | 52 |
|---|---|---|---|---|---|
| K | 0.00E+00 | 8.03E-02 | -3.23E+00 | -1.04E+01 | -4.47E+00 |
| a4 | -7.42E-01 | -3.66E-01 | -3.19E-01 | -1.19E-01 | -8.13E-02 |
| a6 | 1.86E+00 | 9.79E-01 | 3.58E-01 | 2.45E-02 | 3.93E-02 |
| a8 | -4.72E+00 | -1.96E+00 | -4.42E-01 | 1.47E-02 | -1.43E-02 |
| a10 | 8.35E+00 | 2.55E+00 | 3.91E-01 | -1.30E-02 | 3.53E-03 |
| a12 | -9.94E+00 | -1.94E+00 | -2.16E-01 | 4.87E-03 | -5.64E-04 |
| a14 | 7.96E+00 | 8.00E-01 | 7.63E-02 | -1.00E-03 | 5.10E-05 |
| a16 | -3.82E+00 | -1.39E-01 | -1.28E-02 | 1.08E-04 | -1.95E-06 |
| a18 | 8.14E-01 | | | -4.80E-06 | |

FIG. 25

Third Example
F= 2.763 mm, HFOV= 45.977 deg., Fno= 2.4

| No. | | Curvature Radius | Ape. Stop Distance Lens Thickness Air Gap | Refractive Index | Abbe No. | Focal Length | Material |
|---|---|---|---|---|---|---|---|
| | Object | Infinite | 600 | | | | |
| 11 | First Lens | 3.072 | 0.390 | 1.645 | 23.265 | -17.743 | Plastic |
| 12 | | 2.301 | 0.148 | | | | |
| 80 | Ape. Stop | Infinite | -0.088 | | | | |
| 21 | Second Lens | 1.481 | 0.402 | 1.546 | 56.114 | 2.459 | Plastic |
| 22 | | -12.981 | 0.481 | | | | |
| 31 | Third Lens | -3.505 | 0.263 | 1.645 | 23.265 | -3.775 | Plastic |
| 32 | | 8.198 | 0.101 | | | | |
| 41 | Fourth Lens | -5.447 | 0.900 | 1.546 | 56.114 | 1.308 | Plastic |
| 42 | | -0.668 | 0.060 | | | | |
| 51 | Fifth Lens | 3.555 | 0.479 | 1.536 | 56.273 | -1.544 | Plastic |
| 52 | | 0.640 | 0.541 | | | | |
| 60 | IR Filter | Infinite | 0.210 | | | | |
| | IR Filter- Image Plane | Infinite | 0.377 | | | | |
| 71 | Image Plane | Infinite | 0.059 | | | | |

FIG. 26

| No. | 11 | 12 | 21 | 22 | 31 |
|---|---|---|---|---|---|
| K | -1.85E+01 | -5.00E+01 | -2.72E+01 | 0.00E+00 | -6.85E+00 |
| a4 | 6.85E-04 | 2.92E-01 | 8.10E-01 | -9.84E-03 | -7.32E-01 |
| a6 | -3.05E-02 | -1.21E+00 | -2.95E+00 | -1.06E+00 | 1.12E+00 |
| a8 | -6.29E-02 | 3.25E+00 | 8.38E+00 | 8.23E+00 | -3.75E+00 |
| a10 | 1.21E-01 | -5.28E+00 | -1.37E+01 | -3.95E+01 | 4.22E+00 |
| a12 | -5.27E-02 | 5.07E+00 | 9.46E+00 | 1.05E+02 | -1.35E+00 |
| a14 | -1.79E-04 | -1.99E+00 | | -1.47E+02 | |
| a16 | | | | 8.34E+01 | |

| No. | 32 | 41 | 42 | 51 | 52 |
|---|---|---|---|---|---|
| K | 0.00E+00 | 8.03E-02 | -3.23E+00 | -1.04E+01 | -4.47E+00 |
| a4 | -6.19E-01 | -2.73E-01 | -2.79E-01 | -2.00E-01 | -1.14E-01 |
| a6 | 1.15E+00 | 7.17E-01 | 1.24E-01 | 7.87E-02 | 6.48E-02 |
| a8 | -2.58E+00 | -2.56E+00 | 1.07E-01 | 9.20E-03 | -2.71E-02 |
| a10 | 3.76E+00 | 5.42E+00 | -4.17E-01 | -2.33E-02 | 7.53E-03 |
| a12 | -2.67E+00 | -5.77E+00 | 4.79E-01 | 1.12E-02 | -1.32E-03 |
| a14 | 7.58E-01 | 3.04E+00 | -2.16E-01 | -2.71E-03 | 1.29E-04 |
| a16 | -2.27E-03 | -6.45E-01 | 3.31E-02 | 3.36E-04 | -5.32E-06 |
| a18 | -9.38E-05 | | | -1.70E-05 | |

FIG. 27

Fourth Example
F= 2.912 mm, HFOV= 44.32 deg., Fno= 2.4

| No. | | Curvature Radius | Ape. Stop Distance Lens Thickness Air Gap | Refractive Index | Abbe No. | Focal Length | Material |
|---|---|---|---|---|---|---|---|
| | Object | Infinite | 600 | | | | |
| 11 | First Lens | 3.125 | 0.291 | 1.645 | 23.265 | -18.493 | Plastic |
| 12 | | 2.386 | 0.122 | | | | |
| 80 | Ape. Stop | Infinite | -0.097 | | | | |
| 21 | Second Lens | 1.497 | 0.390 | 1.546 | 56.114 | 2.548 | Plastic |
| 22 | | -17.886 | 0.494 | | | | |
| 31 | Third Lens | -3.035 | 0.273 | 1.645 | 23.265 | -3.319 | Plastic |
| 32 | | 7.506 | 0.105 | | | | |
| 41 | Fourth Lens | -4.743 | 0.878 | 1.546 | 56.114 | 1.425 | Plastic |
| 42 | | -0.712 | 0.100 | | | | |
| 51 | Fifth Lens | 2.846 | 0.466 | 1.536 | 56.273 | -1.876 | Plastic |
| 52 | | 0.701 | 0.541 | | | | |
| 60 | IR Filter | Infinite | 0.210 | | | | |
| | IR Filter-Image Plane | Infinite | 0.548 | | | | |
| 71 | Image Plane | Infinite | 0.059 | | | | |

FIG. 28

| No. | 11 | 12 | 21 | 22 | 31 |
|---|---|---|---|---|---|
| K | -1.85E+01 | -5.00E+01 | -2.72E+01 | 0.00E+00 | -6.85E+00 |
| a4 | -4.16E-03 | 3.11E-01 | 8.60E-01 | -4.51E-02 | -7.71E-01 |
| a6 | -7.20E-02 | -1.22E+00 | -2.95E+00 | -3.13E-01 | 9.31E-01 |
| a8 | -1.98E-02 | 3.09E+00 | 7.99E+00 | 8.36E-01 | -2.93E+00 |
| a10 | 1.07E-01 | -4.96E+00 | -1.26E+01 | -1.98E+00 | 2.18E+00 |
| a12 | -3.66E-02 | 5.07E+00 | 8.30E+00 | 1.14E+00 | 2.43E-01 |
| a14 | -2.14E-03 | -1.99E+00 | | 3.79E-04 | |
| a16 | | | | -1.23E-04 | |
| No. | 32 | 41 | 42 | 51 | 52 |
| K | 0.00E+00 | 8.03E-02 | -3.23E+00 | -1.04E+01 | -4.47E+00 |
| a4 | -6.35E-01 | -2.16E-01 | -3.07E-01 | -2.26E-01 | -1.43E-01 |
| a6 | 1.14E+00 | 5.40E-01 | 1.56E-01 | 1.22E-01 | 8.88E-02 |
| a8 | -2.58E+00 | -2.33E+00 | 1.42E-01 | -2.90E-02 | -4.05E-02 |
| a10 | 3.76E+00 | 5.26E+00 | -5.98E-01 | -1.85E-03 | 1.21E-02 |
| a12 | -2.66E+00 | -5.65E+00 | 7.14E-01 | 3.28E-03 | -2.24E-03 |
| a14 | 7.61E-01 | 2.95E+00 | -3.40E-01 | -8.81E-04 | 2.32E-04 |
| a16 | -1.45E-04 | -6.10E-01 | 5.63E-02 | 1.03E-04 | -1.01E-05 |
| a18 | -5.05E-06 | | | -4.63E-06 | |

FIG. 29

Fifth Example

F= 2.949mm, HFOV= 44.085 deg., Fno= 2.4

| No. | | Curvature Radius | Ape. Stop Distance Lens Thickness Air Gap | Refractive Index | Abbe No. | Focal Length | Material |
|---|---|---|---|---|---|---|---|
|  | Object | Infinite | 600 |  |  |  |  |
| 11 | First Lens | 3.128 | 0.293 | 1.645 | 23.265 | -13.404 | Plastic |
| 12 |  | 2.212 | 0.124 |  |  |  |  |
| 80 | Ape. Stop | Infinite | -0.105 |  |  |  |  |
| 21 | Second Lens | 1.422 | 0.386 | 1.546 | 56.114 | 2.436 | Plastic |
| 22 |  | -18.491 | 0.493 |  |  |  |  |
| 31 | Third Lens | -2.954 | 0.289 | 1.645 | 23.265 | -3.332 | Plastic |
| 32 |  | 8.171 | 0.115 |  |  |  |  |
| 41 | Fourth Lens | -4.469 | 0.848 | 1.546 | 56.114 | 1.424 | Plastic |
| 42 |  | -0.707 | 0.102 |  |  |  |  |
| 51 | Fifth Lens | 2.925 | 0.469 | 1.536 | 56.273 | -1.858 | Plastic |
| 52 |  | 0.702 | 0.541 |  |  |  |  |
| 60 | IR Filter | Infinite | 0.210 |  |  |  |  |
|  | IR Filter-Image Plane | Infinite | 0.577 |  |  |  |  |
| 71 | Image Plane | Infinite | 0.059 |  |  |  |  |

FIG. 30

| No. | 11 | 12 | 21 | 22 | 31 |
|---|---|---|---|---|---|
| K | -1.85E+01 | -5.00E+01 | -2.72E+01 | 0.00E+00 | -6.85E+00 |
| a4 | -4.53E-03 | 3.12E-01 | 8.59E-01 | -4.88E-02 | -7.77E-01 |
| a6 | -7.17E-02 | -1.22E+00 | -2.95E+00 | -3.12E-01 | 1.00E+00 |
| a8 | -2.05E-02 | 3.10E+00 | 7.94E+00 | 8.40E-01 | -3.25E+00 |
| a10 | 1.06E-01 | -4.95E+00 | -1.23E+01 | -1.96E+00 | 2.77E+00 |
| a12 | -3.53E-02 | 5.07E+00 | 8.06E+00 | 1.14E+00 | -1.35E-01 |
| a14 | -2.14E-03 | -1.99E+00 | | 3.79E-04 | |
| a16 | | | | -1.23E-04 | |

| No. | 32 | 41 | 42 | 51 | 52 |
|---|---|---|---|---|---|
| K | 0.00E+00 | 8.03E-02 | -3.23E+00 | -1.04E+01 | -4.47E+00 |
| a4 | -6.35E-01 | -2.22E-01 | -3.22E-01 | -2.11E-01 | -1.50E-01 |
| a6 | 1.14E+00 | 6.06E-01 | 2.40E-01 | 9.50E-02 | 9.65E-02 |
| a8 | -2.58E+00 | -2.61E+00 | -3.64E-02 | -1.42E-03 | -4.44E-02 |
| a10 | 3.76E+00 | 5.79E+00 | -4.19E-01 | -2.03E-02 | 1.32E-02 |
| a12 | -2.66E+00 | -6.14E+00 | 6.32E-01 | 1.08E-02 | -2.42E-03 |
| a14 | 7.60E-01 | 3.17E+00 | -3.27E-01 | -2.63E-03 | 2.48E-04 |
| a16 | -4.88E-04 | -6.50E-01 | 5.65E-02 | 3.17E-04 | -1.08E-05 |
| a18 | -5.05E-06 | | | -1.53E-05 | |

FIG. 31

Sixth Example

F= 2.763 mm, HFOV= 46.064 deg., Fno= 2.4

| No. | | Curvature Radius | Ape. Stop Distance Lens Thickness Air Gap | Refractive Index | Abbe No. | Focal Length | Material |
|---|---|---|---|---|---|---|---|
|  | Object | Infinite | 600 |  |  |  |  |
| 11 | First Lens | 2.901 | 0.279 | 1.645 | 23.265 | -28.855 | Plastic |
| 12 |  | 2.415 | 0.197 |  |  |  |  |
| 80 | Ape. Stop | Infinite | -0.078 |  |  |  |  |
| 21 | Second Lens | 1.573 | 0.409 | 1.546 | 56.114 | 2.610 | Plastic |
| 22 |  | -13.786 | 0.502 |  |  |  |  |
| 31 | Third Lens | -3.242 | 0.250 | 1.645 | 23.265 | -3.701 | Plastic |
| 32 |  | 9.307 | 0.129 |  |  |  |  |
| 41 | Fourth Lens | -4.626 | 0.900 | 1.546 | 56.114 | 1.423 | Plastic |
| 42 |  | -0.711 | 0.137 |  |  |  |  |
| 51 | Fifth Lens | 4.839 | 0.515 | 1.536 | 56.273 | -1.730 | Plastic |
| 52 |  | 0.750 | 0.541 |  |  |  |  |
| 60 | IR Filter | Infinite | 0.210 |  |  |  |  |
|  | IR Filter-Image Plane | Infinite | 0.302 |  |  |  |  |
| 71 | Image Plane | Infinite | 0.059 |  |  |  |  |

FIG. 32

| No. | 11 | 12 | 21 | 22 | 31 |
|---|---|---|---|---|---|
| K | -1.85E+01 | -5.00E+01 | 0.00E+00 | 0.00E+00 | -6.85E+00 |
| a4 | -5.82E-03 | 2.96E-01 | -9.19E-02 | -4.26E-02 | -7.78E-01 |
| a6 | -6.87E-02 | -1.23E+00 | 1.73E+00 | -2.85E-01 | 1.05E+00 |
| a8 | -1.66E-02 | 3.22E+00 | -1.63E+01 | 8.67E-01 | -3.60E+00 |
| a10 | 1.07E-01 | -5.26E+00 | 8.84E+01 | -1.89E+00 | 4.06E+00 |
| a12 | -4.26E-02 | 5.07E+00 | -2.70E+02 | 1.14E+00 | -1.57E+00 |
| a14 | -8.10E-03 | -1.99E+00 | 4.34E+02 | 3.79E-04 | |
| a16 | | | -2.83E+02 | -1.23E-04 | |

| No. | 32 | 41 | 42 | 51 | 52 |
|---|---|---|---|---|---|
| K | 0.00E+00 | 8.03E-02 | -3.23E+00 | -1.04E+01 | -4.47E+00 |
| a4 | -6.20E-01 | -2.70E-01 | -3.35E-01 | -1.40E-01 | -9.72E-02 |
| a6 | 1.14E+00 | 7.86E-01 | 2.54E-01 | 4.17E-02 | 5.20E-02 |
| a8 | -2.58E+00 | -2.66E+00 | -2.79E-02 | 1.94E-02 | -1.98E-02 |
| a10 | 3.76E+00 | 5.22E+00 | -3.74E-01 | -2.09E-02 | 4.98E-03 |
| a12 | -2.67E+00 | -5.22E+00 | 4.92E-01 | 8.05E-03 | -7.91E-04 |
| a14 | 7.59E-01 | 2.61E+00 | -2.27E-01 | -1.63E-03 | 7.03E-05 |
| a16 | -2.48E-03 | -5.25E-01 | 3.54E-02 | 1.71E-04 | -2.64E-06 |
| a18 | -1.95E-03 | | | -7.47E-06 | |

| Seventh Example | | | | | | | |
|---|---|---|---|---|---|---|---|
| F= 2.745 mm, HFOV= 46.199 deg., Fno= 2.4 | | | | | | | |
| No. | | Curvature Radius | Ape. Stop Distance Lens Thickness Air Gap | Refractive Index | Abbe No. | Focal Length | Material |
| 11 | Object | Infinite | 600 | | | | |
| 11 | First Lens | 3.017 | 0.294 | 1.645 | 23.265 | -21.933 | Plastic |
| 12 | | 2.391 | 0.144 | | | | |
| 80 | Ape. Stop | Infinite | -0.077 | | | | |
| 21 | Second Lens | 1.543 | 0.421 | 1.546 | 56.114 | 2.540 | Plastic |
| 22 | | -12.352 | 0.493 | | | | |
| 31 | Third Lens | -3.353 | 0.250 | 1.645 | 23.265 | -3.630 | Plastic |
| 32 | | 7.970 | 0.102 | | | | |
| 41 | Fourth Lens | -4.818 | 0.900 | 1.546 | 56.114 | 1.454 | Plastic |
| 42 | | -0.727 | 0.134 | | | | |
| 51 | Fifth Lens | 4.502 | 0.539 | 1.536 | 56.273 | -1.803 | Plastic |
| 52 | | 0.763 | 0.541 | | | | |
| 60 | IR Filter | Infinite | 0.210 | | | | |
| | IR Filter- Image Plane | Infinite | 0.295 | | | | |
| 71 | Image Plane | Infinite | 0.059 | | | | |

| No. | 11 | 12 | 21 | 22 | 31 |
|---|---|---|---|---|---|
| K | -1.85E+01 | -5.00E+01 | 0.00E+00 | 0.00E+00 | -6.85E+00 |
| a4 | -8.96E-03 | 3.01E-01 | -1.25E-01 | -4.66E-02 | -7.82E-01 |
| a6 | -6.48E-02 | -1.23E+00 | 2.06E+00 | -2.92E-01 | 1.04E+00 |
| a8 | -1.65E-02 | 3.24E+00 | -1.90E+01 | 8.54E-01 | -3.47E+00 |
| a10 | 1.06E-01 | -5.27E+00 | 1.01E+02 | -1.97E+00 | 3.36E+00 |
| a12 | -4.94E-02 | 5.07E+00 | -3.03E+02 | 1.14E+00 | -8.91E-01 |
| a14 | -2.14E-03 | -1.99E+00 | 4.79E+02 | 3.79E-04 | |
| a16 | | | -3.08E+02 | -1.23E-04 | |

| No. | 32 | 41 | 42 | 51 | 52 |
|---|---|---|---|---|---|
| K | 0.00E+00 | 8.03E-02 | -3.23E+00 | -1.04E-01 | -4.47E+00 |
| a4 | -5.84E-01 | -2.14E-01 | -3.38E-01 | -1.62E-01 | -9.70E-02 |
| a6 | 6.96E-01 | 3.47E-01 | 2.42E-01 | 6.66E-02 | 5.19E-02 |
| a8 | -5.89E-01 | -1.23E+00 | -3.50E-03 | 1.19E-03 | -2.00E-02 |
| a10 | -1.06E+00 | 2.96E+00 | -4.04E-01 | -1.25E-02 | 5.12E-03 |
| a12 | 4.09E+00 | -3.32E+00 | 5.35E-01 | 5.78E-03 | -8.23E-04 |
| a14 | -4.84E+00 | 1.79E+00 | -2.56E-01 | -1.28E-03 | 7.39E-05 |
| a16 | 2.55E+00 | -3.82E-01 | 4.13E-02 | 1.46E-04 | -2.80E-06 |
| a18 | -4.92E-01 | | | -6.75E-06 | |

FIG. 35

Eighth Example

F= 2.782 mm, HFOV= 46.025 deg., Fno= 2.4

| No. | | Curvature Radius | Lens Thickness Air Gap | Ape. Stop Distance | Refractive Index | Abbe No. | Focal Length | Material |
|---|---|---|---|---|---|---|---|---|
| | Object | Infinite | | 600 | | | | |
| 11 | First Lens | 2.961 | 0.284 | | 1.645 | 23.265 | -26.083 | Plastic |
| 12 | | 2.423 | 0.181 | | | | | |
| 80 | Ape. Stop | Infinite | -0.082 | | | | | |
| 21 | Second Lens | 1.553 | 0.471 | | 1.546 | 56.114 | 2.566 | Plastic |
| 22 | | -12.750 | 0.442 | | | | | |
| 31 | Third Lens | -3.273 | 0.250 | | 1.645 | 23.265 | -3.719 | Plastic |
| 32 | | 9.228 | 0.161 | | | | | |
| 41 | Fourth Lens | -6.705 | 0.900 | | 1.546 | 56.114 | 1.481 | Plastic |
| 42 | | -0.756 | 0.183 | | | | | |
| 51 | Fifth Lens | 11.777 | 0.558 | | 1.536 | 56.273 | -1.699 | Plastic |
| 52 | | 0.832 | 0.541 | | | | | |
| 60 | IR Filter | Infinite | 0.210 | | | | | |
| | IR Filter-Image Plane | Infinite | 0.209 | | | | | |
| 71 | Image Plane | Infinite | 0.059 | | | | | |

FIG. 36

| No. | 11 | 12 | 21 | 22 | 31 |
|---|---|---|---|---|---|
| K | -1.85E+01 | -5.00E+01 | -2.72E+01 | 0.00E+00 | -6.85E+00 |
| a4 | -1.19E-02 | 2.84E-01 | 8.10E-01 | -4.78E-02 | -7.99E-01 |
| a6 | -6.87E-02 | -1.23E+00 | -2.78E+00 | -2.89E-01 | 1.04E+00 |
| a8 | -2.91E-02 | 3.17E+00 | 8.00E+00 | 8.63E-01 | -3.64E+00 |
| a10 | 1.15E-01 | -5.23E+00 | -1.37E+01 | -1.89E+00 | 4.19E+00 |
| a12 | -4.76E-02 | 5.07E+00 | 1.01E+01 | 1.14E+00 | -1.51E+00 |
| a14 | -2.14E-03 | -1.99E+00 | | 3.79E-04 | |
| a16 | | | | -1.23E-04 | |

| No. | 32 | 41 | 42 | 51 | 52 |
|---|---|---|---|---|---|
| K | 0.00E+00 | 8.03E-02 | -3.23E+00 | -1.04E+01 | -4.47E+00 |
| a4 | -6.27E-01 | -2.55E-01 | -3.26E-01 | -1.46E-01 | -1.04E-01 |
| a6 | 1.14E+00 | 6.60E-01 | 2.54E-01 | 3.81E-02 | 5.84E-02 |
| a8 | -2.58E+00 | -2.01E+00 | -3.53E-02 | 4.07E-02 | -2.18E-02 |
| a10 | 3.76E+00 | 3.60E+00 | -3.32E-01 | -4.12E-02 | 5.24E-03 |
| a12 | -2.66E+00 | -3.31E+00 | 4.35E-01 | 1.71E-02 | -7.90E-04 |
| a14 | 7.61E-01 | 1.53E+00 | -2.02E-01 | -3.75E-03 | 6.69E-05 |
| a16 | 2.53E-05 | -2.85E-01 | 3.20E-02 | 4.28E-04 | -2.40E-06 |
| a18 | -5.05E-06 | | | -2.01E-05 | |

| No. | | Curvature Radius | Ape. Stop Distance Lens Thickness Air Gap | Refractive Index | Abbe No. | Focal Length | Material |
|---|---|---|---|---|---|---|---|
| | Object | Infinite | 600 | | | | |
| 11 | First Lens | 3.029 | 0.288 | 1.645 | 23.265 | -21.453 | Plastic |
| 12 | | 2.392 | 0.136 | | | | |
| 80 | Ape. Stop | Infinite | -0.076 | | | | |
| 21 | Second Lens | 1.547 | 0.437 | 1.546 | 56.114 | 2.521 | Plastic |
| 22 | | -11.219 | 0.485 | | | | |
| 31 | Third Lens | -3.418 | 0.250 | 1.645 | 23.265 | -3.599 | Plastic |
| 32 | | 7.431 | 0.089 | | | | |
| 41 | Fourth Lens | -4.880 | 0.900 | 1.546 | 56.114 | 1.478 | Plastic |
| 42 | | -0.738 | 0.164 | | | | |
| 51 | Fifth Lens | 4.661 | 0.533 | 1.536 | 56.273 | -1.838 | Plastic |
| 52 | | 0.781 | 0.541 | | | | |
| 60 | IR Filter | Infinite | 0.210 | | | | |
| | IR Filter-Image Plane | Infinite | 0.260 | | | | |
| 71 | Image Plane | Infinite | 0.058 | | | | |

Ninth Example
F= 2.724 mm, HFOV= 46.405deg., Fno= 2.4

| No. | 11 | 12 | 21 | 22 | 31 |
|---|---|---|---|---|---|
| K | -1.85E+01 | -5.00E+01 | 0.00E+00 | 0.00E+00 | -6.85E+00 |
| a4 | -8.95E-03 | 3.02E-01 | -1.27E-01 | -5.22E-02 | -7.80E-01 |
| a6 | -6.47E-02 | -1.23E+00 | 1.99E+00 | -2.97E-01 | 9.90E-01 |
| a8 | -1.79E-02 | 3.24E+00 | -1.80E+01 | 8.37E-01 | -3.21E+00 |
| a10 | 1.12E-01 | -5.26E+00 | 9.35E+01 | -1.93E+00 | 2.64E+00 |
| a12 | -5.26E-02 | 5.07E+00 | -2.76E+02 | 1.14E+00 | -8.26E-02 |
| a14 | -2.14E-03 | -1.99E+00 | 4.27E+02 | 3.79E-04 | 0.00E+00 |
| a16 | | | -2.70E+02 | -1.23E-04 | |
| No. | 32 | 41 | 42 | 51 | 52 |
| K | 0.00E+00 | 8.03E-02 | -3.23E+00 | -1.04E+01 | -4.47E+00 |
| a4 | -5.73E-01 | -2.06E-01 | -3.42E-01 | -1.64E-01 | -9.33E-02 |
| a6 | 5.42E-01 | 2.39E-01 | 2.49E-01 | 7.37E-02 | 4.89E-02 |
| a8 | 7.61E-02 | -8.61E-01 | -1.57E-02 | -8.56E-03 | -1.85E-02 |
| a10 | -2.66E+00 | 2.45E+00 | -3.84E-01 | -6.04E-03 | 4.66E-03 |
| a12 | 6.48E+00 | -3.01E+00 | 5.25E-01 | 3.44E-03 | -7.39E-04 |
| a14 | -7.03E+00 | 1.71E+00 | -2.55E-01 | -8.11E-04 | 6.55E-05 |
| a16 | 3.67E+00 | -3.82E-01 | 4.18E-02 | 9.45E-05 | -2.45E-06 |
| a18 | -7.36E-01 | | | -4.45E-06 | |

FIG. 39

|  | Example 1 | Example 2 | Example 3 | Example 4 | Example 5 | Example 6 | Example 7 | Example 8 | Example 9 |
|---|---|---|---|---|---|---|---|---|---|
| ALT | 2.173 | 2.470 | 2.433 | 2.298 | 2.286 | 2.353 | 2.404 | 2.463 | 2.408 |
| AAG | 0.936 | 0.831 | 0.702 | 0.724 | 0.729 | 0.887 | 0.796 | 0.884 | 0.799 |
| T4/(AG12+AG34) | 2.220 | 6.055 | 5.581 | 6.749 | 6.347 | 3.635 | 5.325 | 3.462 | 6.023 |
| AG23/(AG12+AG45) | 1.703 | 1.725 | 4.005 | 3.958 | 4.067 | 1.964 | 2.447 | 1.568 | 2.164 |
| T2/T1 | 1.333 | 2.111 | 1.030 | 1.342 | 1.318 | 1.462 | 1.430 | 1.661 | 1.520 |
| AAG/T1 | 3.246 | 3.323 | 1.800 | 2.491 | 2.487 | 3.174 | 2.705 | 3.118 | 2.778 |
| ALT/T4 | 2.720 | 2.345 | 2.704 | 2.617 | 2.695 | 2.614 | 2.671 | 2.737 | 2.675 |
| AG23/T3 | 1.897 | 1.865 | 1.827 | 1.812 | 1.704 | 2.009 | 1.971 | 1.767 | 1.942 |
| ALT/AG23 | 4.580 | 5.295 | 5.063 | 4.649 | 4.637 | 4.683 | 4.879 | 5.574 | 4.959 |
| T4/T3 | 3.195 | 4.211 | 3.421 | 3.219 | 2.932 | 3.600 | 3.600 | 3.600 | 3.600 |
| T2/T3 | 1.536 | 2.110 | 1.526 | 1.430 | 1.335 | 1.634 | 1.683 | 1.884 | 1.749 |
| T2/(AG12+AG34) | 1.068 | 3.034 | 2.490 | 2.999 | 2.890 | 1.650 | 2.490 | 1.812 | 2.927 |
| AG23/(AG12+AG34) | 1.318 | 2.682 | 2.980 | 3.799 | 3.688 | 2.029 | 2.916 | 1.700 | 3.249 |
| T2/(AG12+AG45) | 1.379 | 1.952 | 3.346 | 3.125 | 3.187 | 1.597 | 2.090 | 1.671 | 1.949 |

FIG. 40

OPTICAL IMAGING LENS AND ELECTRONIC DEVICE COMPRISING THE SAME

CROSS REFERENCE TO RELATED APPLICATION

This application claims priority to Taiwan Application No. 102127841, filed on Aug. 2, 2013.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of five lens elements and an electronic device which includes such optical imaging lens set of five lens elements.

2. Description of the Prior Art

In recent years, the popularity of mobile phones and digital cameras makes the photography modules of various portable electronic products, such as optical imaging lens elements or an image sensor, develop quickly, and the shrinkage of mobile phones and digital cameras also makes a greater and greater demand for the miniaturization of the photography module. The current trend of research is to develop an optical imaging lens set of a shorter length with uncompromised good quality.

For example, U.S. Pat. No. 7,502,181, U.S. Pat. No. 7,826,151 and U.S. Pat. No. 8,422,145 disclose an optical imaging lens set made of five lens elements. However, the aperture stop of these optical imaging lens set are disposed in front of the first lens element, and the half of field of view (HFOV) of these optical imaging lens set are only about 32~33 degrees. In addition, the distance from the object-side of the first lens element to the image plane is about 6.5~8 mm.

Therefore, how to enlarge the field of view and to reduce the system length efficiently, but meanwhile, the optical performance can be maintained, is an important research direction.

SUMMARY OF THE INVENTION

In the light of the above, the present invention is capable of proposing an optical imaging lens set of lightweight, low production cost, reduced length, high resolution and high image quality. The optical imaging lens set of five lens elements of the present invention has a first lens element, an aperture stop, a second lens element, a third lens element, a fourth lens element and a fifth lens element sequentially from an object side to an image side along an optical axis.

The present invention provides an optical imaging lens set, from an object side toward an image side in order along an optical axis comprising: a first lens element with refractive power, having a convex first object-side surface facing toward said object side and a first image-side surface facing toward said image side, and said first image-side surface having a concave part in a vicinity of a circular periphery of said first lens element; an aperture stop; a second lens element with refractive power, having a second object-side surface facing toward said object side, and said second object-side surface having a convex part in a vicinity of a circular periphery of said second lens element; a third lens element with refractive power, having a third object-side surface facing toward said object side, and said third object-side surface having a concave part in a vicinity of a circular periphery of said third lens element; a fourth lens element with refractive power; and a fifth lens element with refractive power, having a fifth image-side surface facing toward said image side, and said fifth image-side surface having a concave part in a vicinity of said optical axis; wherein the fifth lens element is made of plastic and the optical imaging lens set exclusively has only five lens elements with refractive power.

In the optical imaging lens set of five lens elements of the present invention, an air gap AG12 along the optical axis is disposed between the first lens element and the second lens element, an air gap AG23 along the optical axis is disposed between the second lens element and the third lens element, an air gap AG34 along the optical axis is disposed between the third lens element and the fourth lens element, an air gap AG45 along the optical axis is disposed between the fourth lens element and the fifth lens element, and the sum of total four air gaps between adjacent lens elements from the first lens element to the fifth lens element along the optical axis is AAG=AG12+AG23+AG34+AG45.

In the optical imaging lens set of five lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, the fifth lens element has a fifth lens element thickness T5 along the optical axis, and the total thickness of all the lens elements in the optical imaging lens set along the optical axis is ALT=T1+T2+T3+T4+T5.

In the optical imaging lens set of five lens elements of the present invention, it is $2.2 \leq T4/(AG12+AG34)$.

In the optical imaging lens set of five lens elements of the present invention, it is $1.7 \leq AG23/(AG12+AG45)$.

In the optical imaging lens set of five lens elements of the present invention, it is $2.3 \leq AAG/T1$.

In the optical imaging lens set of five lens elements of the present invention, it is $ALT/T4 \leq 2.8$.

In the optical imaging lens set of five lens elements of the present invention, it is $1 \leq T2/T1$.

In the optical imaging lens set of five lens elements of the present invention, it is $1.5 \leq AG23/T3$.

In the optical imaging lens set of five lens elements of the present invention, it is $ALT/AG23 \leq 5.5$.

In the optical imaging lens set of five lens elements of the present invention, it is $3.3 \leq T4/T3$.

In the optical imaging lens set of five lens elements of the present invention, it is $1.3 \leq T2/T3$.

In the optical imaging lens set of five lens elements of the present invention, it is $1.6 \leq T2/(AG12+AG34) \leq 2.5$.

In the optical imaging lens set of five lens elements of the present invention, it is $1.6 \leq AG23/(AG12+AG34)$.

In the optical imaging lens set of five lens elements of the present invention, it is $1.9 \leq T2/(AG12+AG45) \leq 3.3$.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 22 shows the optical data of the first example of the optical imaging lens set.

FIG. 23 shows the aspheric surface data of the first example.

FIG. 24 shows the optical data of the second example of the optical imaging lens set.

FIG. 25 shows the aspheric surface data of the second example.

FIG. 26 shows the optical data of the third example of the optical imaging lens set.

FIG. 27 shows the aspheric surface data of the third example.

FIG. 28 shows the optical data of the fourth example of the optical imaging lens set.

FIG. 29 shows the aspheric surface data of the fourth example.

FIG. 30 shows the optical data of the fifth example of the optical imaging lens set.

FIG. 31 shows the aspheric surface data of the fifth example.

FIG. 32 shows the optical data of the sixth example of the optical imaging lens set.

FIG. 33 shows the aspheric surface data of the sixth example.

FIG. 34 shows the optical data of the seventh example of the optical imaging lens set.

FIG. 35 shows the aspheric surface data of the seventh example.

FIG. 36 shows the optical data of the eighth example of the optical imaging lens set.

FIG. 37 shows the aspheric surface data of the eighth example.

FIG. 38 shows the optical data of the ninth example of the optical imaging lens set.

FIG. 39 shows the aspheric surface data of the ninth example.

FIG. 40 shows some important ratios in the examples.

DETAILED DESCRIPTION

Figure 19:
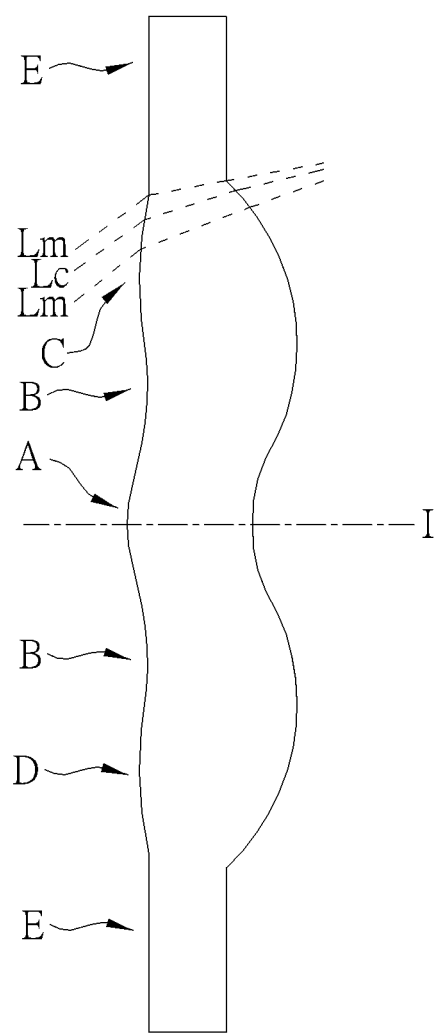
FIG. 19 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taken FIG. 19 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 19. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11, 13, 15 and 17.

Figure 1:
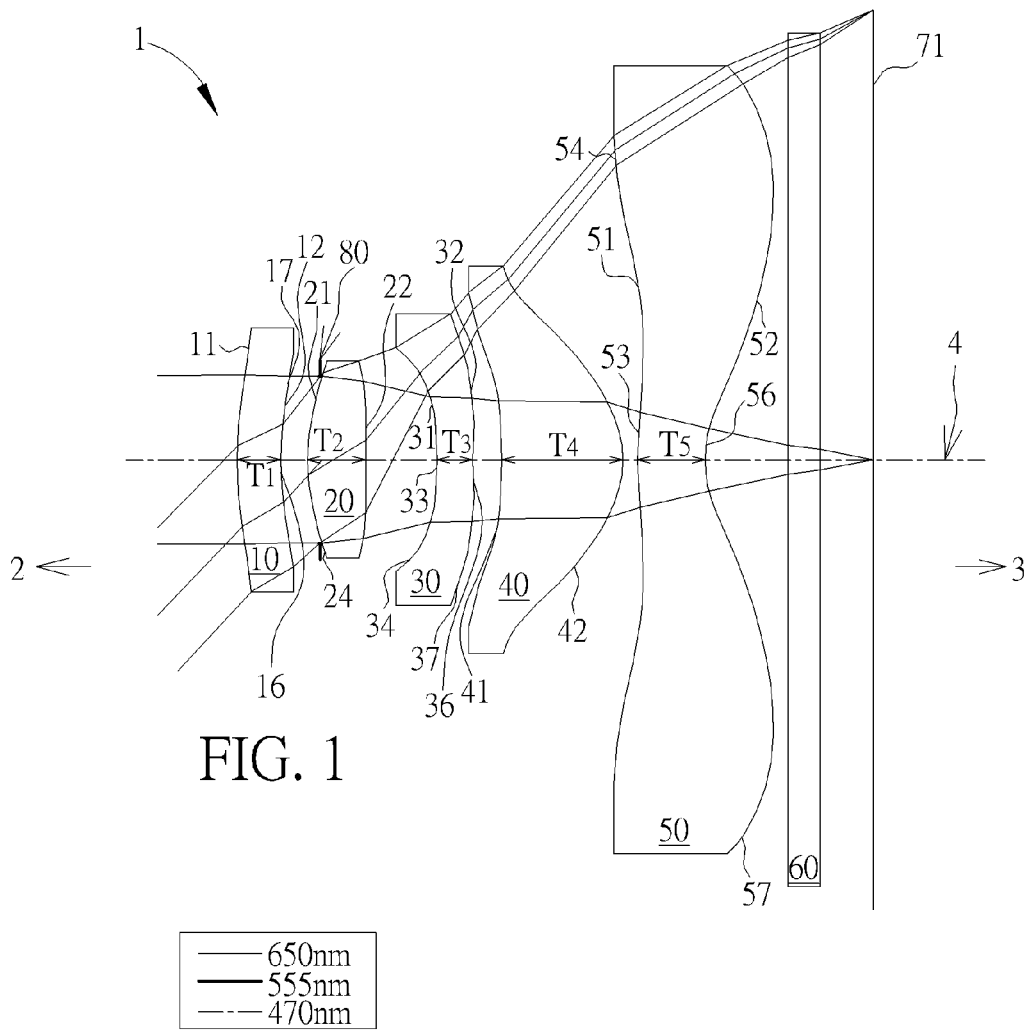
FIG. 1 illustrates a first example of the optical imaging lens set of the present invention.

As shown in FIG. 1, the optical imaging lens set 1 of five lens elements of the present invention, sequentially from an object side 2 (where an object is located) to an image side 3 along an optical axis 4, has a first lens element 10, a second lens element 20, a third lens element 30, a fourth lens element 40, a fifth lens element 50, a filter 60 and an image plane 71. Generally speaking, the first lens element 10, the second lens element 20, the third lens element 30, the fourth lens element 40 and the fifth lens element 50 may be made of a transparent plastic material and each has an appropriate refractive power, but the present invention is not limited to this. There are exclusively five lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the first lens element 10 and the second lens element 20. When light emitted or reflected by an object (not shown) which is located at the object side 2 enters the optical imaging lens set 1 of the present invention, it forms a clear and sharp image on the image plane 71 at the image side 3 after passing through the first lens element 10, the aperture stop 80, the second lens element 20, the third lens element 30, the fourth lens element 40, the fifth lens element 50 and the filter 60.

In the embodiments of the present invention, the optional filter 60 may be a filter of various suitable functions, for example, the filter 60 may be an infrared cut filter (IR cut filter), placed between the fifth lens element 50 and the image plane 71. The filter 60 is made of glass, without affecting the focal length of the optical lens element system, namely the optical imaging lens set, of the present invention.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, and the fifth lens element 50 has a fifth lens element thickness T5. Therefore, the total thickness of all the lens elements in the optical imaging lens set 1 along the optical axis 4 is ALT=T1+T2+T3+T4+T5.

In addition, between two adjacent lens elements in the optical imaging lens set 1 of the present invention there is an air gap along the optical axis 4. For example, an air gap AG12 is disposed between the first lens element 10 and the second lens element 20, an air gap AG23 is disposed between the second lens element 20 and the third lens element 30, an air gap AG34 is disposed between the third lens element 30 and the fourth lens element 40, and an air gap AG45 is disposed between the fourth lens element 40 and the fifth lens element 50. Therefore, the sum of total four air gaps between adjacent lens elements from the first lens element 10 to the fifth lens element 50 along the optical axis 4 is AAG=AG12+AG23+AG34+AG45.

First Example

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height". The image height is 2.950 mm.

The optical imaging lens set 1 of the first example has five lens elements 10 to 50; each is made of a plastic material and has refractive power. The optical imaging lens set 1 also has an aperture stop 80, a filter 60, and an image plane 71. The aperture stop 80 is provided between the first lens element 10 and the second lens element 20. The filter 60 may be an infrared filter (IR cut filter) to prevent inevitable infrared light reaching the image plane to adversely affect the imaging quality.

The first lens element 10 has negative refractive power. The first object-side surface 11 facing toward the object side 2 is a convex surface and the first image-side surface 12 facing toward the image side 3 has a concave part 16 in the vicinity of the optical axis and a concave part 17 in a vicinity of its circular periphery. Both the first object-side surface 11 and the first image-side 12 of the first lens element 10 are aspherical surfaces.

The second lens element 20 has positive refractive power. The second object-side surface 21 facing toward the object side 2 is a convex surface and has a convex part 24 in a vicinity of its circular periphery. The second image-side surface 22 facing toward the image side 3 is a convex surface. In addition, both the second object-side surface 21 and the second image-side surface 22 of the second lens element 20 are aspherical surfaces.

The third lens element 30 has negative refractive power, a third object-side surface 31 facing toward the object side 2 and a third image-side surface 32 facing toward the image side 3. The third object-side surface 31 has a concave part 33 in the vicinity of the optical axis and a concave part 34 in a vicinity of its circular periphery. The third image-side surface 32 has a concave part 36 in the vicinity of the optical axis and a convex part 37 in a vicinity of its circular periphery. In addition, both the third object-side surface 31 and the third image-side surface 32 of the third lens element 30 are aspherical surfaces.

The fourth lens element 40 has positive refractive power. The fourth object-side surface 41 facing toward the object side 2 is a concave surface and the fourth image-side surface 42 facing toward the image side 3 is a convex surface. Both the fourth object-side surface 41 and the fourth image-side 42 of the fourth lens element 40 are aspherical surfaces.

The fifth lens element 50 has negative refractive power, a fifth object-side surface 51 facing toward the object side 2 and a fifth image-side surface 52 facing toward the image side 3. The fifth object-side surface 51 has a convex part 53 in the vicinity of the optical axis and a concave part 54 in a vicinity of its circular periphery. The fifth image-side surface 52 has a concave part 56 in the vicinity of the optical axis and a convex part 57 in a vicinity of its circular periphery. Further, both the fifth object-side surface 51 and the fifth image-side 52 of the fifth lens element 50 are aspherical surfaces. The filter 60 may be an infrared cut filter, and is disposed between the fifth lens element 50 and the image plane 71.

In the optical imaging lens element 1 of the present invention, the object-side surfaces 11/21/31/41/51 and image-side surfaces 12/22/32/42/52 are all aspherical. These aspheric coefficients are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_{2i}$ is the aspheric coefficient of the 2i order.

The optical data of the first example of the optical imaging lens set 1 are shown in FIG. 22 while the aspheric surface data are shown in FIG. 23. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set is 4.197 mm. The image height is 2.950 mm. Some important ratios of the first example are as follows:
ALT=2.173
AAG=0.936
T4/(AG12+AG34)=2.220
AG23/(AG12+AG45)=1.703
T2/T1=1.333
AAG/T1=3.246
ALT/T4=2.720
AG23/T3=1.897
ALT/AG23=4.580
T4/T3=3.195
T2/T3=1.536
T2/(AG12+AG34)=1.068
AG23/(AG12+AG34)=1.318
T2/(AG12+AG45)=1.379

Second Example

Figure 3:
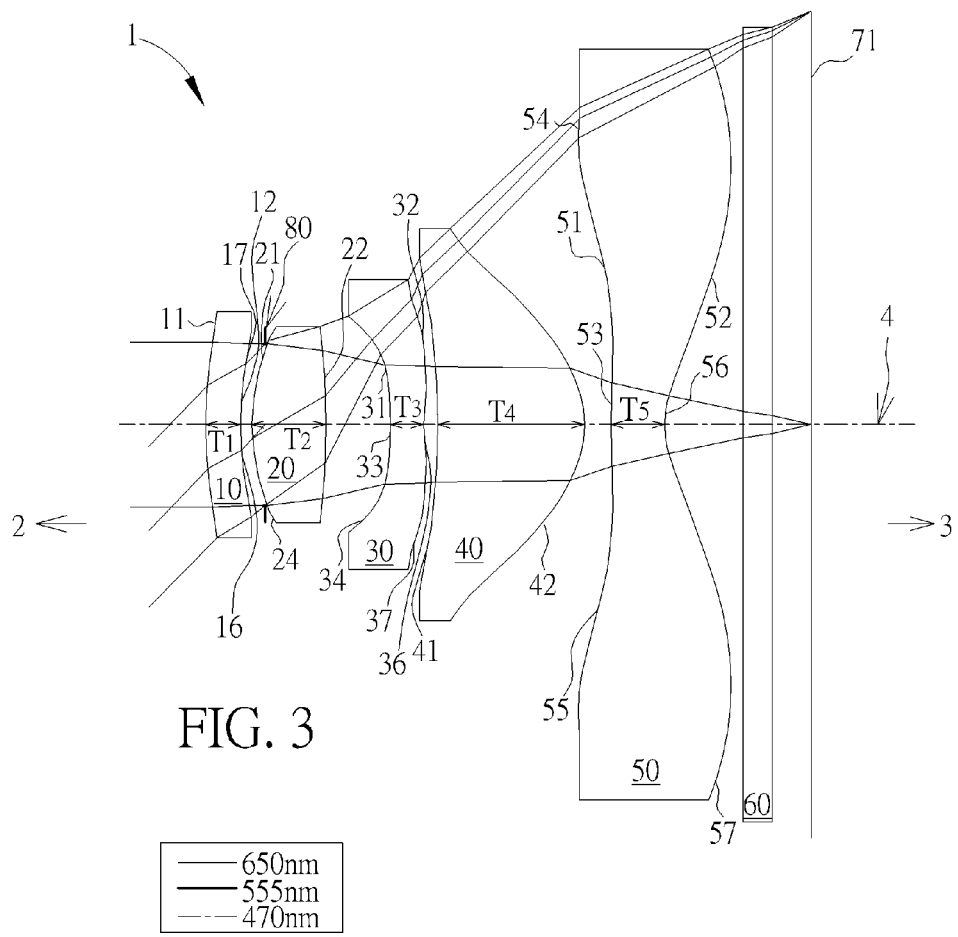
FIG. 3 illustrates a second example of the optical imaging lens set of five lens elements of the present invention.
Figures 4A, 4B, 4C, 4D:
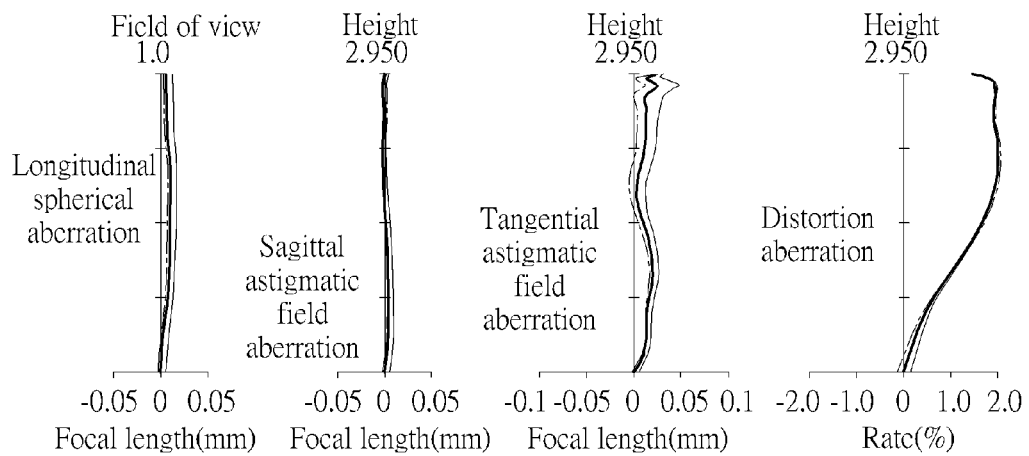
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar with those in the first example, but the optical data in this example are different from the optical data in the first example, and in this embodiment, the fifth object-side surface 51 of the fifth lens element 50 has a convex part 53 in the vicinity of the optical axis and a convex part 54 in a vicinity of its circular periphery as well as a concave part 55 between the vicinity of the optical axis and the vicinity of the circular periphery. The optical data of the second example of the optical imaging lens set are shown in FIG. 24 while the aspheric surface data are shown in FIG. 25. The length of the optical imaging lens set is 4.347 mm. The image height is 2.950 mm. Some important ratios of the second example are as follows:
ALT=2.470
AAG=0.831
T4/(AG12+AG34)=6.055
AG23/(AG12+AG45)=1.725
T2/T1=2.111
AAG/T1=3.323
ALT/T4=2.345

AG23/T3=1.865
ALT/AG23=5.295
T4/T3=4.211
T2/T3=2.110
T2/(AG12+AG34)=3.034
AG23/(AG12+AG34)=2.682
T2/(AG12+AG45)=1.952

Third Example

Figure 5:
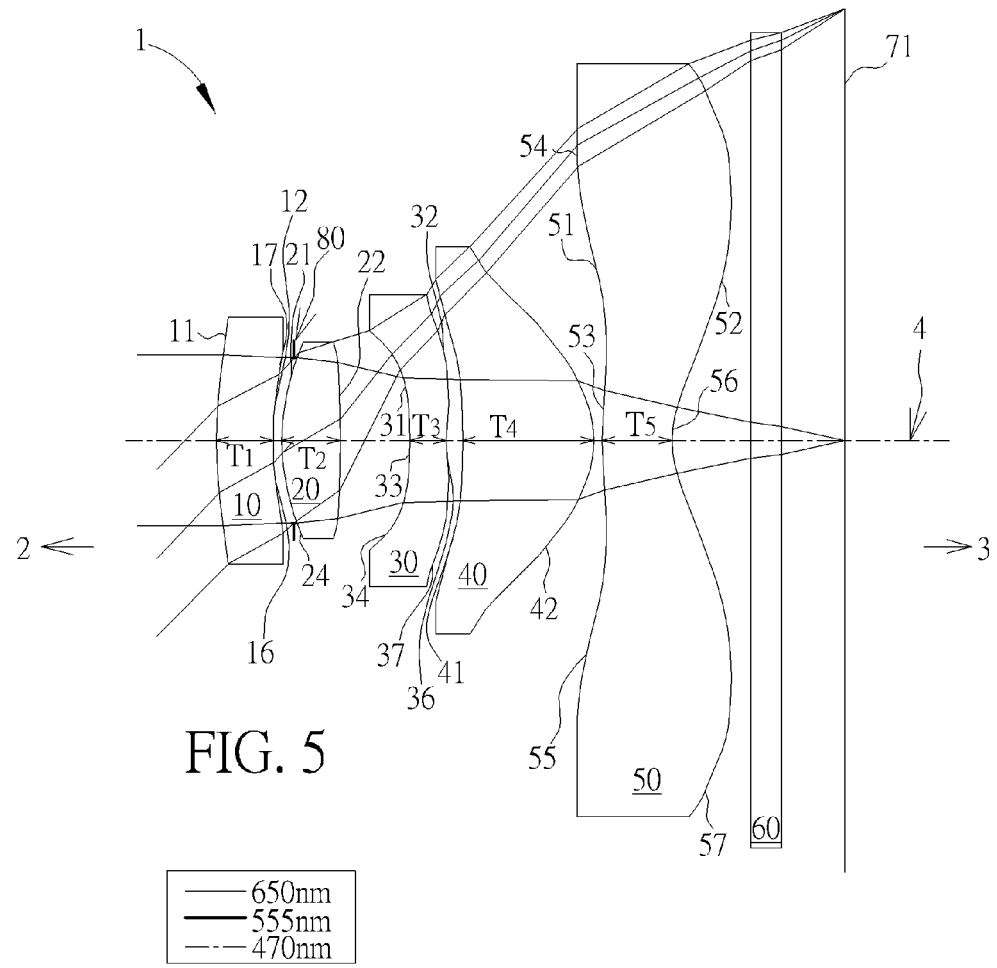
FIG. 5 illustrates a third example of the optical imaging lens set of five lens elements of the present invention.
Figures 6A, 6B, 6C, 6D:
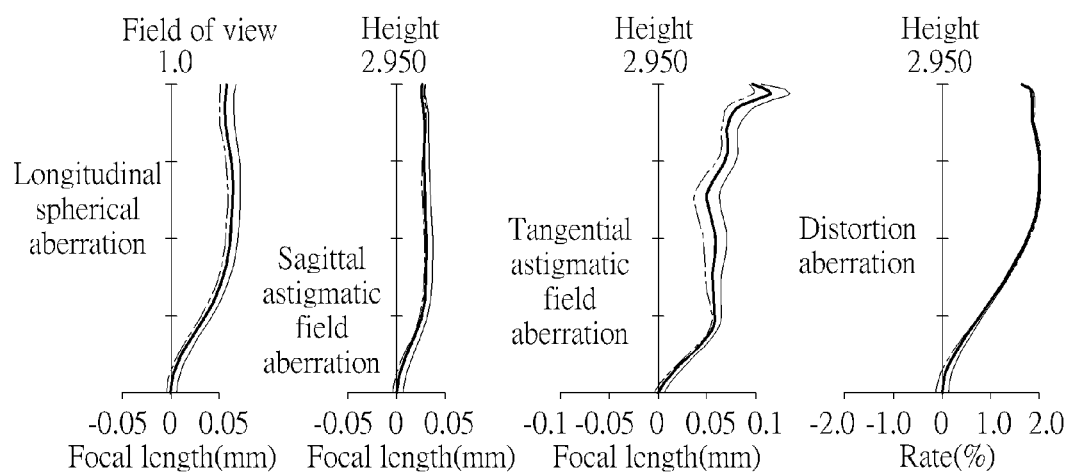
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar with those in the first example, but the optical data in this example are different from the optical data in the first example, and in this embodiment, the fifth object-side surface 51 of the fifth lens element 50 has a convex part 53 in the vicinity of the optical axis and a convex part 54 in a vicinity of its circular periphery as well as a concave part 55 between the optical axis and the circular periphery. The optical data of the second example of the optical imaging lens set are shown in FIG. 26 while the aspheric surface data are shown in FIG. 27. The length of the optical imaging lens set is 4.263 mm. The image height is 2.950 mm. Some important ratios of the second example are as follows:
ALT=2.433
AAG=0.702
T4/(AG12+AG34)=5.581
AG23/(AG12+AG45)=4.005
T2/T1=1.030
AAG/T1=1.800
ALT/T4=2.704
AG23/T3=1.827
ALT/AG23=5.063
T4/T3=3.421
T2/T3=1.526
T2/(AG12+AG34)=2.490
AG23/(AG12+AG34)=2.980
T2/(AG12+AG45)=3.346

Fourth Example

Figure 7:
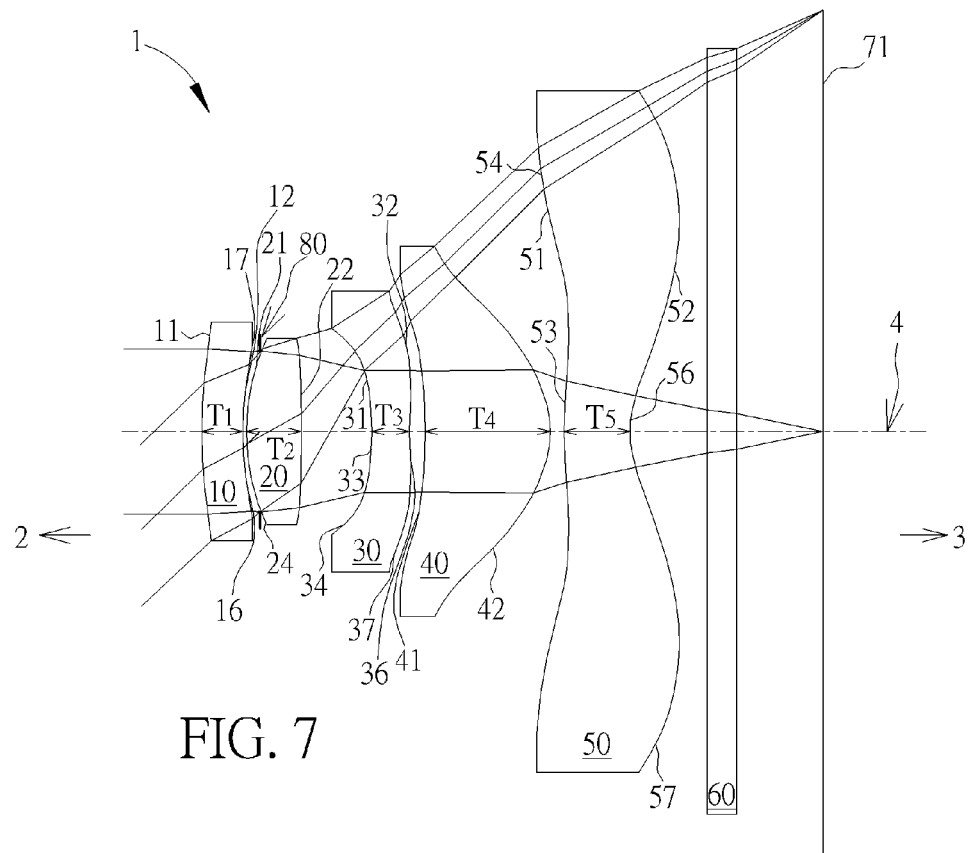
FIG. 7 illustrates a fourth example of the optical imaging lens set of five lens elements of the present invention.
Figures 8A, 8B, 8C, 8D:
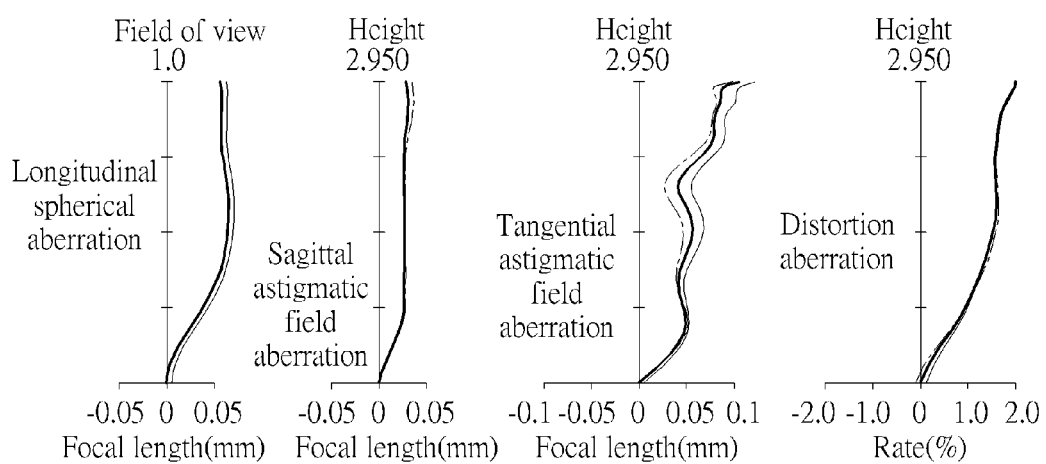
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar with those in the first example, but the optical data in this example are different from the optical data in the first example. The optical data of the second example of the optical imaging lens set are shown in FIG. 28 while the aspheric surface data are shown in FIG. 29. The length of the optical imaging lens set is 4.321 mm. The image height is 2.950 mm. Some important ratios of the second example are as follows:
ALT=2.298
AAG=0.724
T4/(AG12+AG34)=6.749
AG23/(AG12+AG45)=3.958
T2/T1=1.342
AAG/T1=2.491
ALT/T4=2.617
AG23/T3=1.812
ALT/AG23=4.649
T4/T3=3.219
T2/T3=1.430
T2/(AG12+AG34)=2.999
AG23/(AG12+AG34)=3.799
T2/(AG12+AG45)=3.125

Fifth Example

Figure 9:
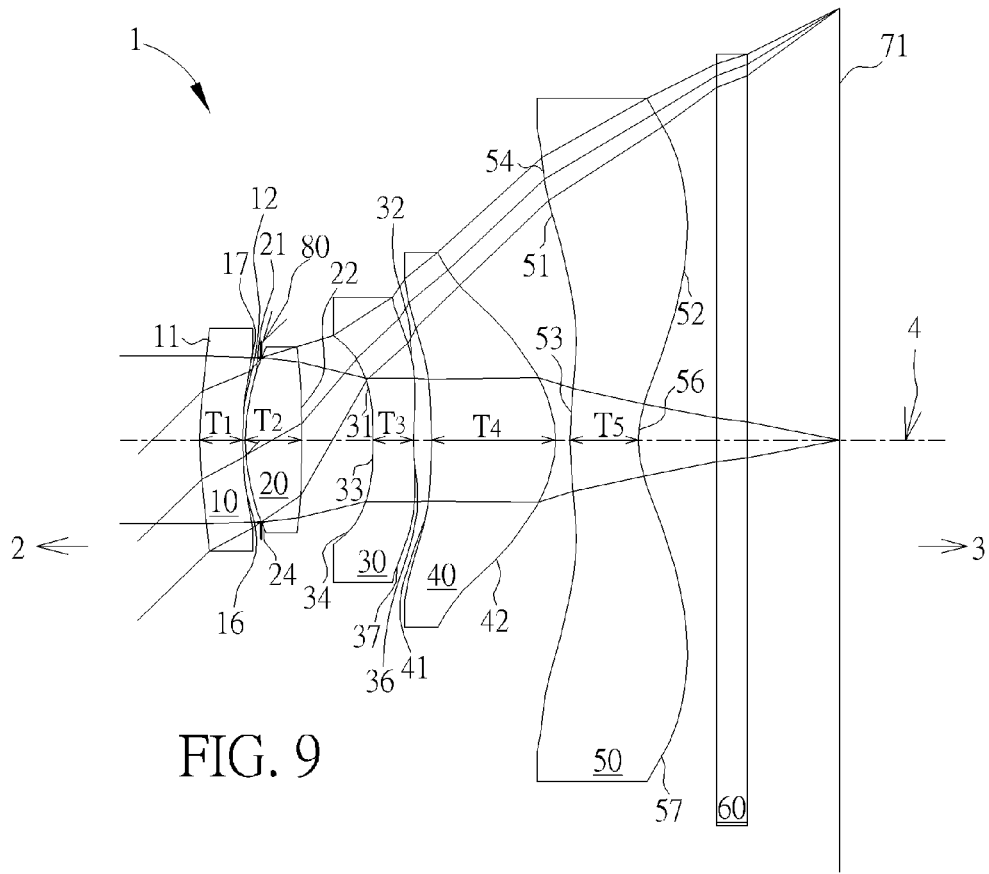
FIG. 9 illustrates a fifth example of the optical imaging lens set of five lens elements of the present invention.
Figures 10A, 10B, 10C, 10D:
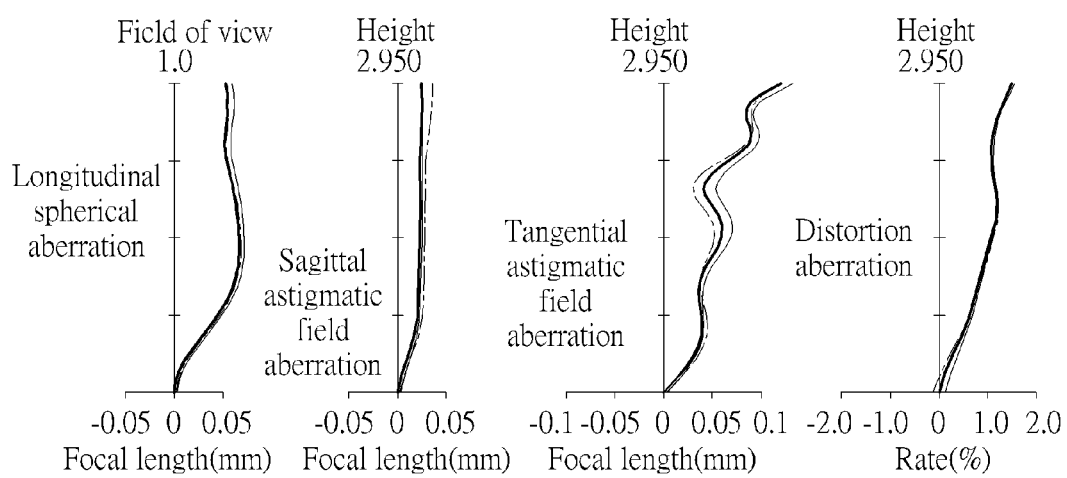
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar with those in the first example, but the optical data in this example are different from the optical data in the first example. The optical data of the second example of the optical imaging lens set are shown in FIG. 30 while the aspheric surface data are shown in FIG. 31. The length of the optical imaging lens set is 4.344 mm. The image height is 2.950 mm. Some important ratios of the second example are as follows:
ALT=2.286
AAG=0.729
T4/(AG12+AG34)=6.347
AG23/(AG12+AG45)=4.067
T2/T1=1.318
AAG/T1=2.487
ALT/T4=2.695
AG23/T3=1.704
ALT/AG23=4.637
T4/T3=2.932
T2/T3=1.335
T2/(AG12+AG34)=2.890
AG23/(AG12+AG34)=3.688
T2/(AG12+AG45)=3.187

Sixth Example

Figure 11:
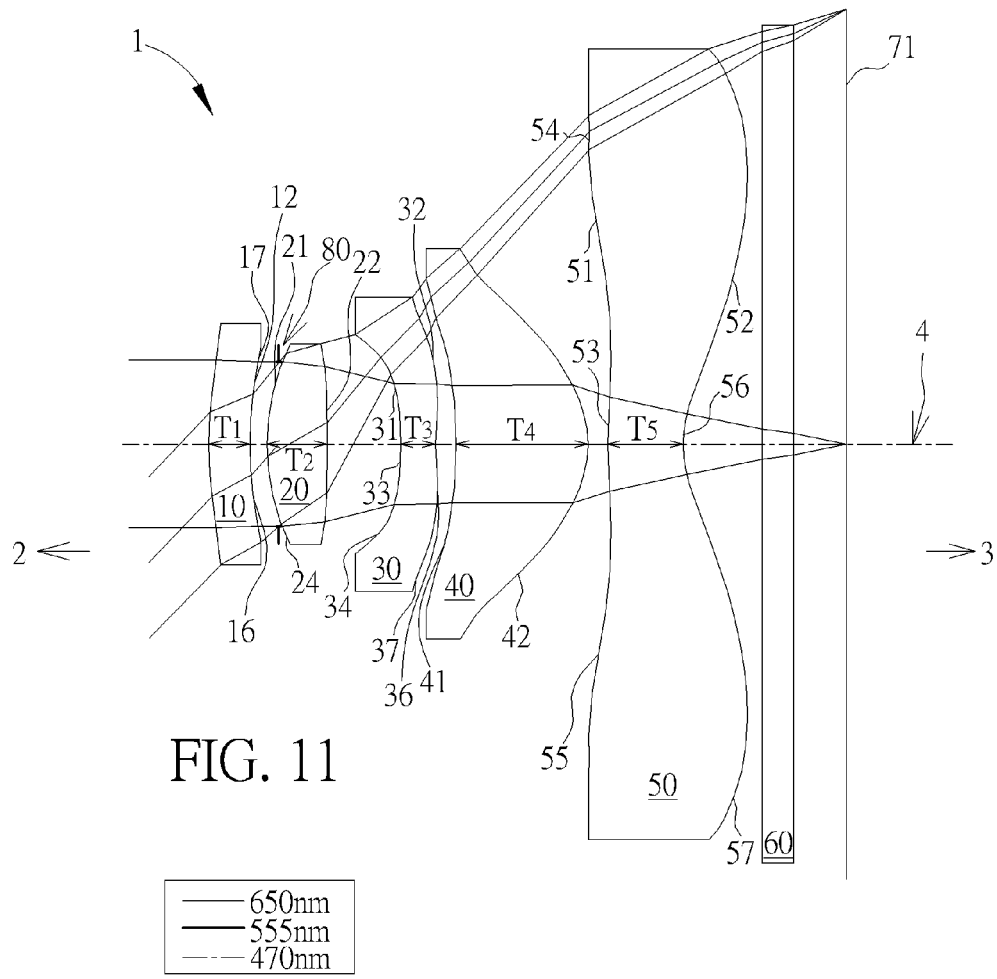
FIG. 11 illustrates a sixth example of the optical imaging lens set of five lens elements of the present invention.
Figures 12A, 12B, 12C, 12D:
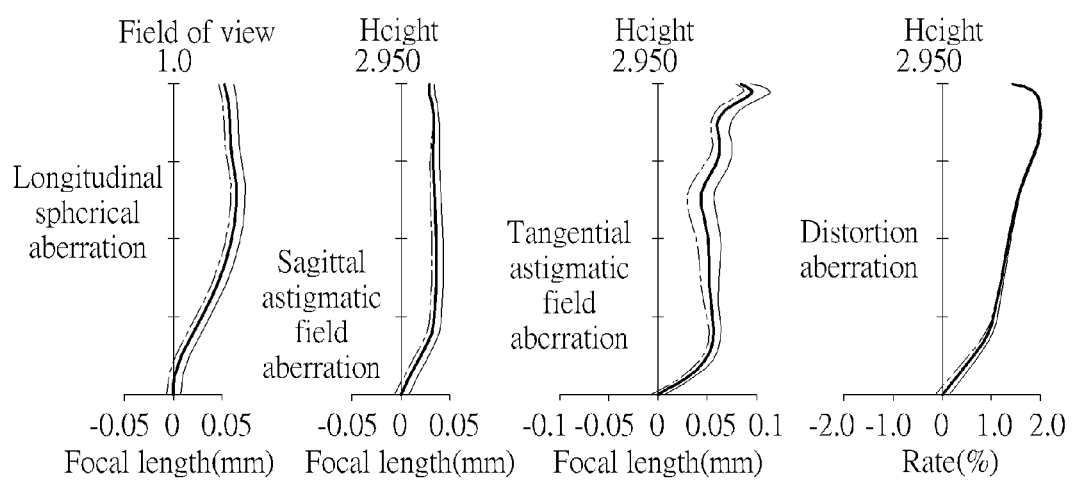
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar with those in the first example, but the optical data in this example are different from the optical data in the first example, and in this embodiment, the fifth object-side surface 51 of the fifth lens element 50 has a convex part 53 in the vicinity of the optical axis and a convex part 54 in a vicinity of its circular periphery as well as a concave part 55 between the optical axis and the circular periphery. The optical data of the second example of the optical imaging lens set are shown in FIG. 32 while the aspheric surface data are shown in FIG. 33. The length of the optical imaging lens set is 4.293 mm. The image height is 2.950 mm. Some important ratios of the second example are as follows:
ALT=2.353
AAG=0.887
T4/(AG12+AG34)=3.635

AG23/(AG12+AG45)=1.964
T2/T1=1.462
AAG/T1=3.174
ALT/T4=2.614
AG23/T3=2.009
ALT/AG23=4.683
T4/T3=3.600
T2/T3=1.634
T2/(AG12+AG34)=1.650
AG23/(AG12+AG34)=2.029
T2/(AG12+AG45)=1.597

Seventh Example

Figure 13:
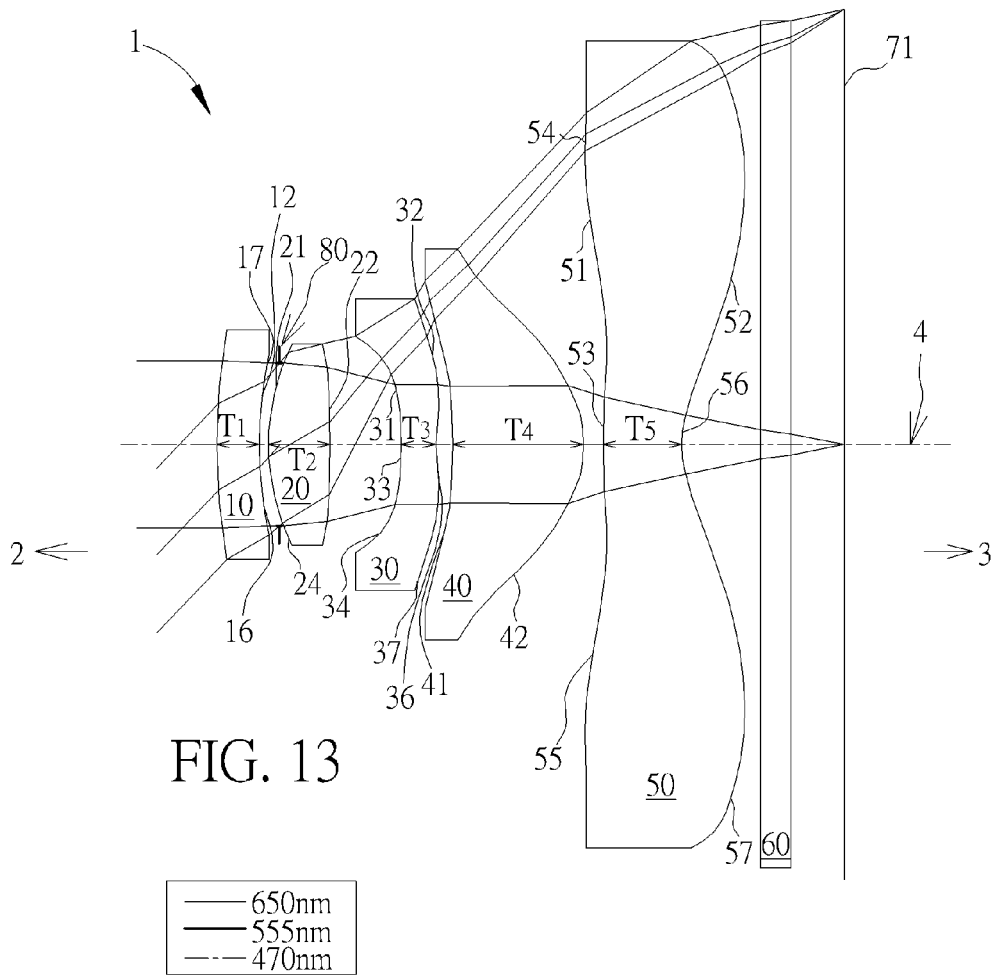
FIG. 13 illustrates a seventh example of the optical imaging lens set of five lens elements of the present invention.
Figures 14A, 14B, 14C, 14D:
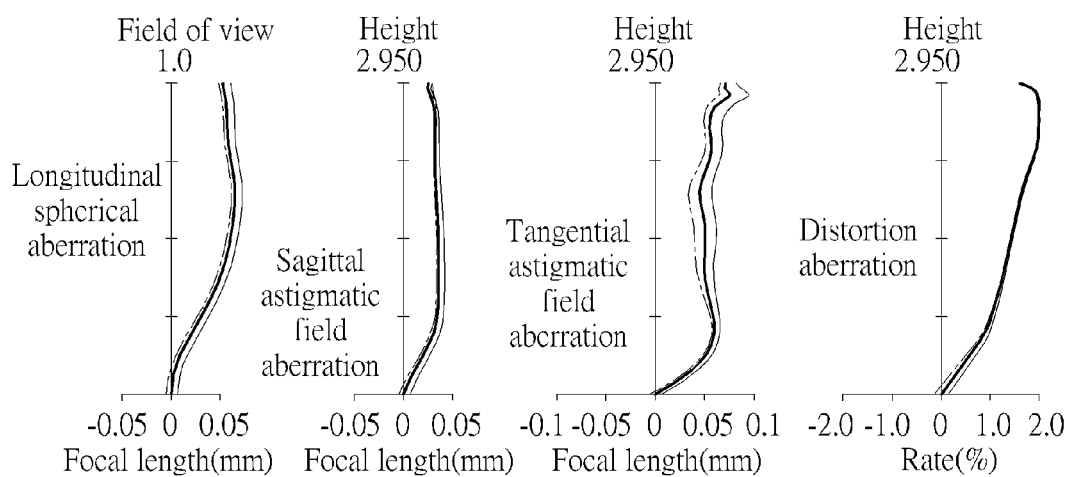
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar with those in the first example, but the optical data in this example are different from the optical data in the first example, and in this embodiment, the fifth object-side surface 51 of the fifth lens element 50 has a convex part 53 in the vicinity of the optical axis and a convex part 54 in a vicinity of its circular periphery as well as a concave part 55 between the optical axis and the circular periphery. The optical data of the second example of the optical imaging lens set are shown in FIG. 34 while the aspheric surface data are shown in FIG. 35. The length of the optical imaging lens set is 4.247 mm. The image height is 2.950 mm. Some important ratios of the second example are as follows:
ALT=2.404
AAG=0.796
T4/(AG12+AG34)=5.325
AG23/(AG12+AG45)=2.447
T2/T1=1.430
AAG/T1=2.705
ALT/T4=2.671
AG23/T3=1.971
ALT/AG23=4.879
T4/T3=3.600
T2/T3=1.683
T2/(AG12+AG34)=2.490
AG23/(AG12+AG34)=2.916
T2/(AG12+AG45)=2.090

Eighth Example

Figure 15:
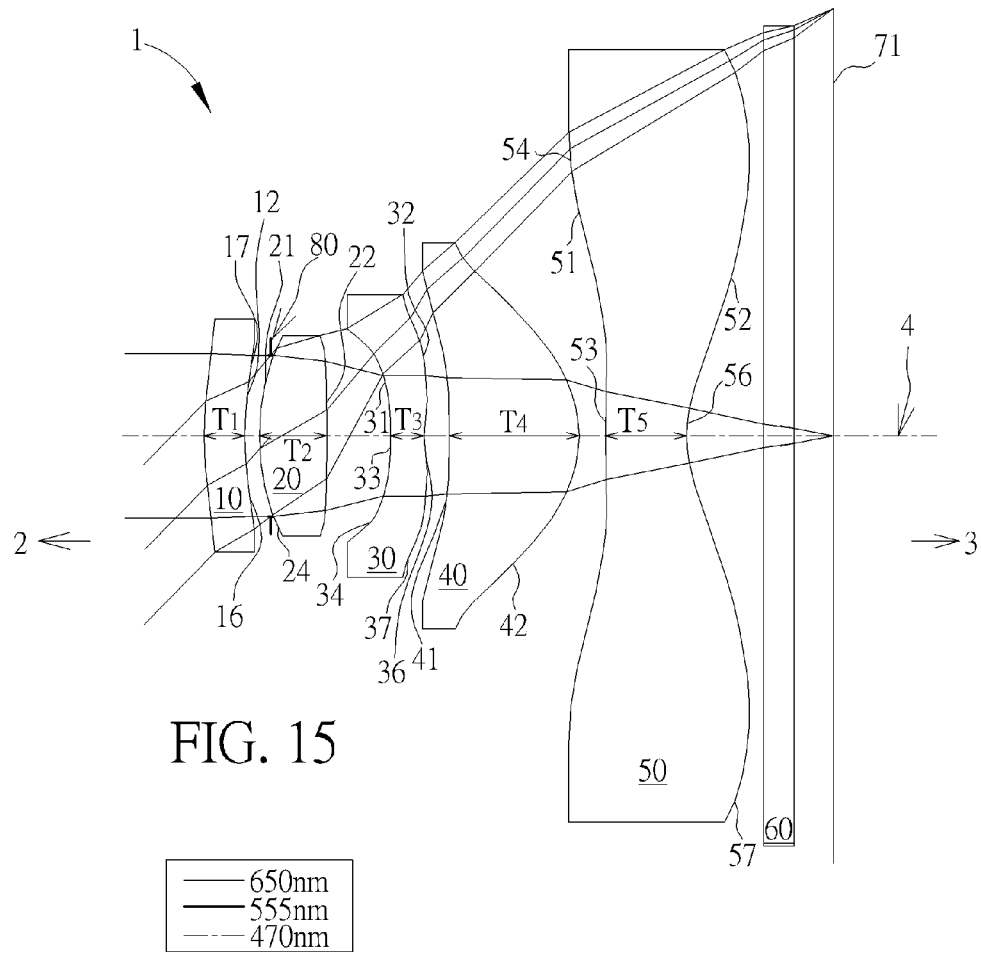
FIG. 15 illustrates an eighth example of the optical imaging lens set of five lens elements of the present invention.
Figures 16A, 16B, 16C, 16D:
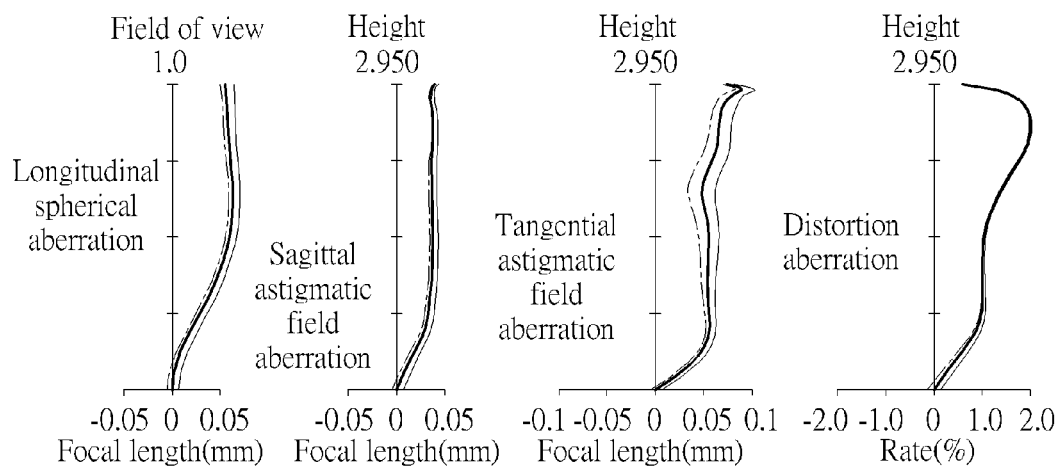
FIG. 16A illustrates the longitudinal spherical aberration on the image plane of the eighth example.
FIG. 16B illustrates the astigmatic aberration on the sagittal direction of the eighth example.
FIG. 16C illustrates the astigmatic aberration on the tangential direction of the eighth example.
FIG. 16D illustrates the distortion aberration of the eighth example.

Please refer to FIG. 15 which illustrates the eighth example of the optical imaging lens set 1 of the present invention. Please refer to FIG. 16A for the longitudinal spherical aberration on the image plane 71 of the eighth example; please refer to FIG. 16B for the astigmatic aberration on the sagittal direction; please refer to FIG. 16C for the astigmatic aberration on the tangential direction, and please refer to FIG. 16D for the distortion aberration. The components in the eighth example are similar with those in the first example, but the optical data in this example are different from the optical data in the first example. The optical data of the second example of the optical imaging lens set are shown in FIG. 36 while the aspheric surface data are shown in FIG. 37. The length of the optical imaging lens set is 4.307 mm. The image height is 2.950 mm. Some important ratios of the second example are as follows:
ALT=2.463
AAG=0.884
T4/(AG12+AG34)=3.462
AG23/(AG12+AG45)=1.568
T2/T1=1.661
AAG/T1=3.118
ALT/T4=2.737
AG23/T3=1.767
ALT/AG23=5.574
T4/T3=3.600
T2/T3=1.884
T2/(AG12+AG34)=1.812
AG23/(AG12+AG34)=1.700
T2/(AG12+AG45)=1.671

Ninth Example

Figure 17:
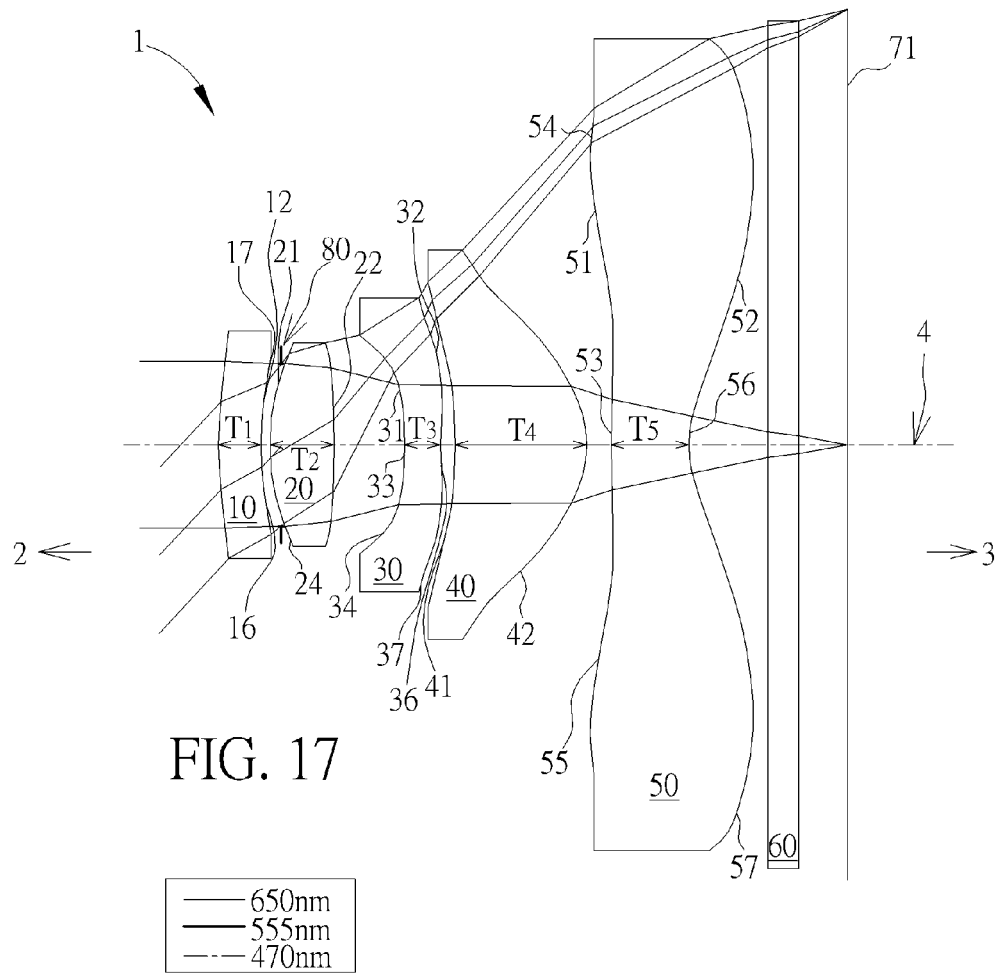
FIG. 17 illustrates a ninth example of the optical imaging lens set of five lens elements of the present invention.
Figures 18A, 18B, 18C, 18D:
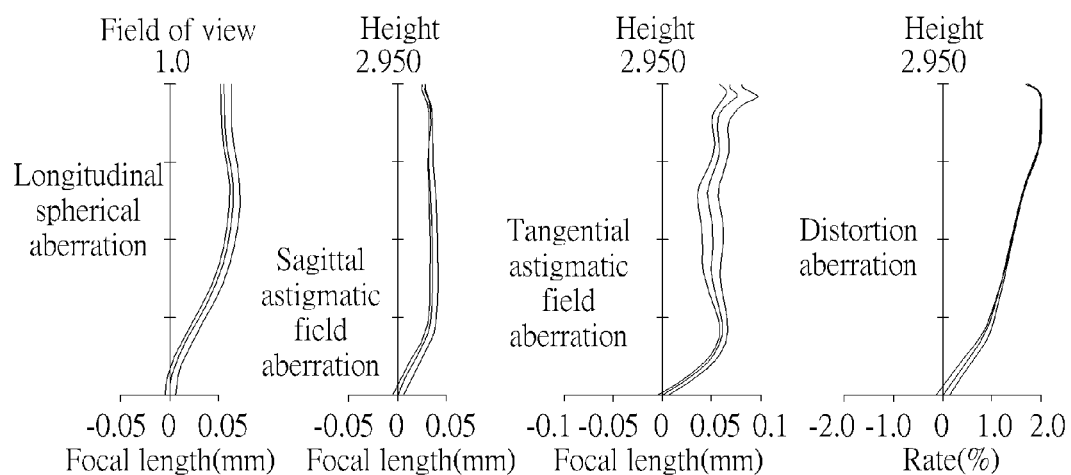
FIG. 18A illustrates the longitudinal spherical aberration on the image plane of the ninth example.
FIG. 18B illustrates the astigmatic aberration on the sagittal direction of the ninth example.
FIG. 18C illustrates the astigmatic aberration on the tangential direction of the ninth example.
FIG. 18D illustrates the distortion aberration of the ninth example.

Please refer to FIG. 17 which illustrates the ninth example of the optical imaging lens set 1 of the present invention. Please refer to FIG. 18A for the longitudinal spherical aberration on the image plane 71 of the ninth example; please refer to FIG. 18B for the astigmatic aberration on the sagittal direction; please refer to FIG. 18C for the astigmatic aberration on the tangential direction, and please refer to FIG. 18D for the distortion aberration. The components in the ninth example are similar with those in the first example, but the optical data in this example are different from the optical data in the first example, and in this embodiment, the fifth object-side surface 51 of the fifth lens element 50 has a convex part 53 in the vicinity of the optical axis and a convex part 54 in a vicinity of its circular periphery as well as a concave part 55 between the optical axis and the circular periphery. The optical data of the second example of the optical imaging lens set are shown in FIG. 38 while the aspheric surface data are shown in FIG. 39. The length of the optical imaging lens set is 4.218 mm. The image height is 2.950 mm. Some important ratios of the second example are as follows:
ALT=2.408
AAG=0.799
T4/(AG12+AG34)=6.023
AG23/(AG12+AG45)=2.164
T2/T1=1.520
AAG/T1=2.778
ALT/T4=2.675
AG23/T3=1.942
ALT/AG23=4.959
T4/T3=3.600
T2/T3=1.749
T2/(AG12+AG34)=2.927
AG23/(AG12+AG34)=3.249
T2/(AG12+AG45)=1.949

Some important ratios in each example are shown in FIG. 40.

In the light of the above examples, the inventors observe the following features:

(1) The first object-side surface of the first lens element is a convex surface, that helps collecting light, and the aperture stop is disposed between the first lens element and the second lens element, that enlarges the field of view (FOV) and improves the aberration. Besides, the first image-side surface of the first lens element has a concave part in a vicinity of its circular periphery, the second object-side surface of the second lens element has a convex part in a vicinity of its circular periphery, the third object-side surface of the third lens element has a concave part in a vicinity of its circular periphery, and the fifth image-side surface of the fifth lens element has a concave part in a vicinity of the optical axis, where each of the surfaces match to each other, in order to improve the aberration.

Figures 2A, 2B, 2C, 2D:
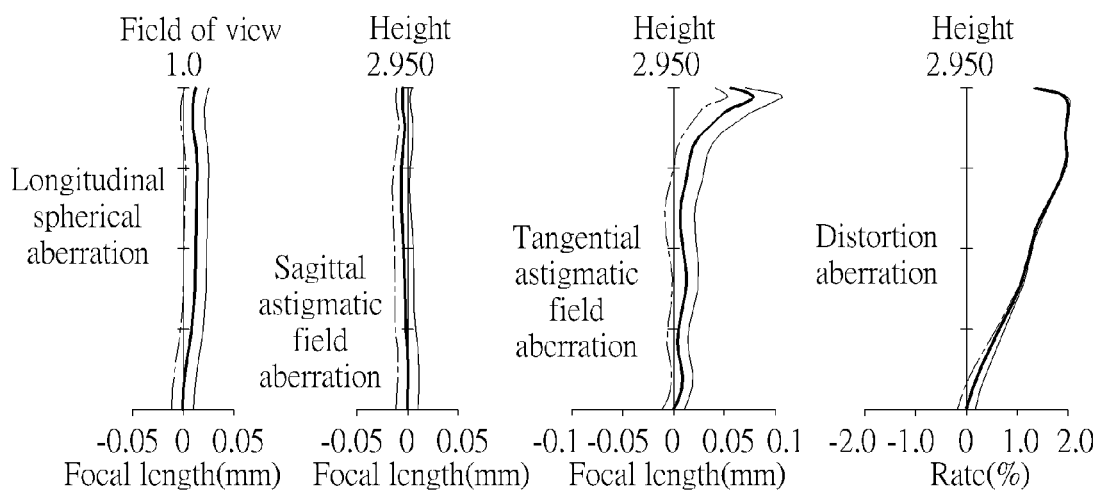
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

(2) Take the first embodiment as an example, in FIG. 2A, the curves of different wavelength are very close to each other, which means all of the off-axis light is focused on the vicinity of the imaging point, and the deviation between each off-axis light and the imaging point is ±0.07 mm, so the spherical aberration has been improved significantly. Besides, since the different curves are close to each other, the imaging positions of different wavelengths are close to each other too, improving chromatic aberration.

(3) As shown in FIG. 2B and FIG. 2C, the focus in the whole view region of three different wavelengths is between ±0.15 mm, which means the optical imaging lens set of the first embodiment can eliminate the aberrations effectively. Furthermore, the distance between the curves is very small, meaning that the dispersion on the axis has greatly improved too. Please refer to FIG. 2D. The distortion aberration of the first embodiment is maintained in the range of ±2%, which means it has achieved the quality requirements of the imaging optical system, compared to conventional optical imaging lens sets, even though the length of the optical imaging lens set of the present invention has been reduced to only 4.2 mm. However, the HFOV is up to about 47 degrees, and overcomes chromatic aberration and provides better image quality. In summary, the first embodiment of the present invention has shorter length of the optical imaging lens set and larger HFOV, but still has good optical performance.

In addition, the inventors discover that there are some better ratio ranges for different data according to the above various important ratios. Better ratio ranges help the designers to design the better optical performance and an effectively reduced length of a practically possible optical imaging lens set. For example:

(1) T4/(AG12+AG34)≥2.2: AG12 is an air gap between said first lens element and said second lens element along the optical axis, AG34 is an air gap between said third lens element and said fourth lens element along the optical axis. If reducing AG12 and AG34, the length of whole optical imaging lens set can be reduced too. If the relationship T4/(AG12+AG34)≥2.2 is satisfied, it can have a better arrangement for T4, AG12 and AG34. It is suggested that the range may be 2.2~8.0.

(2) AG23/(AG12+AG45)≥1.7: AG23 is an air gap between said second lens elements and said third lens element along the optical axis, since the third object-side surface has a concave part in a vicinity of a circular periphery of said third lens element, so AG23 cannot be reduced significantly. However, AG12 and AG45 are not limited by the limitation mentioned above, and AG12 and AG45 are suggested to be shrunk in order to reduce the whole length of the optical imaging lens set. It is suggested that the range may be 1.7~5.0.

(3) T2/T1≥1.0: T1 and T2 are the thickness of the first lens element and the second lens element along said optical axis respectively, if the relationship T2/T1≥1.0 is satisfied, it can have a better arrangement for T1 and T2. It is suggested that the range may be 1.0~2.5.

(4) AAG/T1≥2.3: AAG is the sum of all four air gaps between each lens element from said first lens element to said fifth lens element along the optical axis. Even though AAG should be reduced to shrink the total thickness of the optical imaging lens set, the AAG cannot be too small, which would increase the difficulty of the lens assembling. T1 is suggested to be small, so AAG/T1 is preferably large, but ideally, it is suggested that the range may be 2.3~3.5.

(5) ALT/T4≤2.8: ALT is the total thickness ALT of each lens element, along said optical axis. If the relationship ALT/T4≤2.8 is satisfied, it can have a better arrangement for each lens element. It is suggested that the range may be 2.0~2.8.

(6) AG23/T3≥1.5: AG23 cannot be reduced as mentioned above, but T3 is not limited in this way. In order to shrink the total thickness of the optical imaging lens set, AG23/T3 is preferably large, but ideally, it is suggested that the range may be 1.5~2.5.

(7) ALT/AG23≤5.5: AG23 cannot be reduced as mentioned above, but ALT is not limited in this way. In order to shrink the total thickness of the optical imaging lens set, ALT/AG23 is preferably small, but ideally, it is suggested that the range may be 4.0~5.5.

(8) T4/T3≥1.3 and T2/T3≥1.3: if the relationship can be satisfied, it can have a better arrangement for the second lens element, the third lens element and the fourth lens element. T4/T3 is suggested to be between 3.3~4.5, and T2/T3 is suggested to be between 1.3~2.5.

(9) AG23/(AG12+AG34)≥1.6: AG23 cannot be reduced as mentioned above, but AG12 and AG34 are not limited in this way. In order to shrink the total thickness of the optical imaging lens set, AG23/(AG12+AG34) is preferably large, but ideally, it is suggested that the range may be 1.6~4.5.

(10) T2/(AG12+AG34) is preferably between 1.6~2.5 and T2/(AG12+AG45) is preferably between 1.9~3.3, to achieve a better arrangement for T2, AG12, AG34 and AG45. If T2/(AG12+AG34) or T2/(AG12+AG45) is too large, it may cause the total length of the optical imaging lens set to be too long, but if T2/(AG12+AG34) or T2/(AG12+AG45) is too small, it is not easy for assembling and manufacturing.

Figure 20:
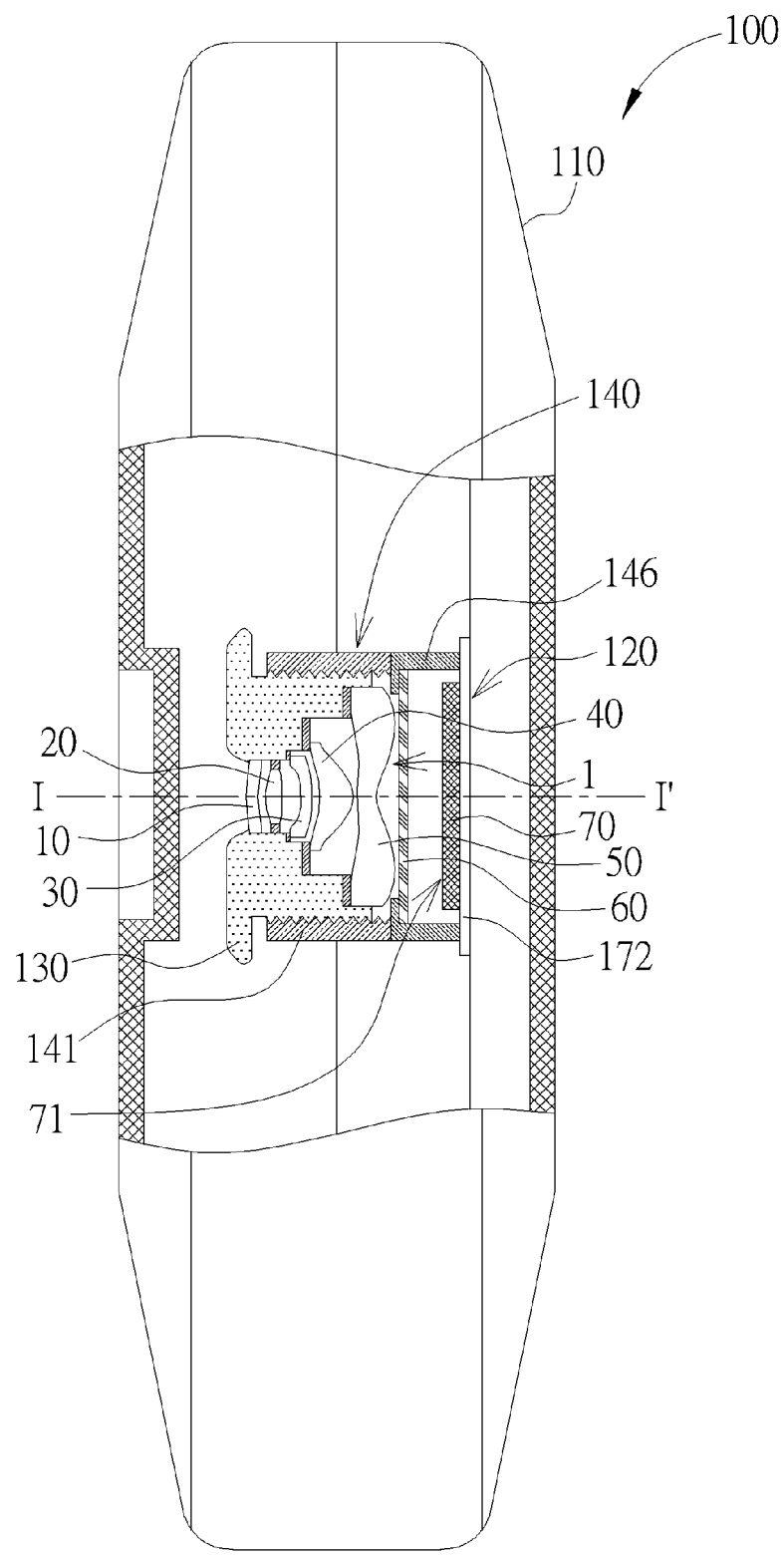
FIG. 20 illustrates a first preferred example of the portable electronic device with an optical imaging lens set of the present invention.

The optical imaging lens set 1 of the present invention may be applied to a portable electronic device. Please refer to FIG. 20. FIG. 20 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 20 as an example, but the portable electronic device 100 is not limited to a mobile phone.

As shown in FIG. 20, the image module 120 includes the optical imaging lens set 1 as described above. FIG. 20 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 60 may be omitted in other examples although the optional filter 60 is present in this example. The case 110, the barrel 130, and/or the module housing unit 140 may be a single element or consist of a plurality of elements, but the present invention is not limited to this.

Each one of the five lens elements 10, 20, 30, 40 and 50 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Because the optical imaging lens set 1 of the present invention may be as short as 4.1~4.4 mm, this ideal length allows the dimensions and the size of the portable electronic device 100 to be smaller and lighter, but excellent optical performance and image quality are still possible. In such a way, the various examples of the present invention satisfy the need for economic benefits of using less raw materials in addition to satisfy the trend for a smaller and lighter product design and consumers' demands.

Figure 21:
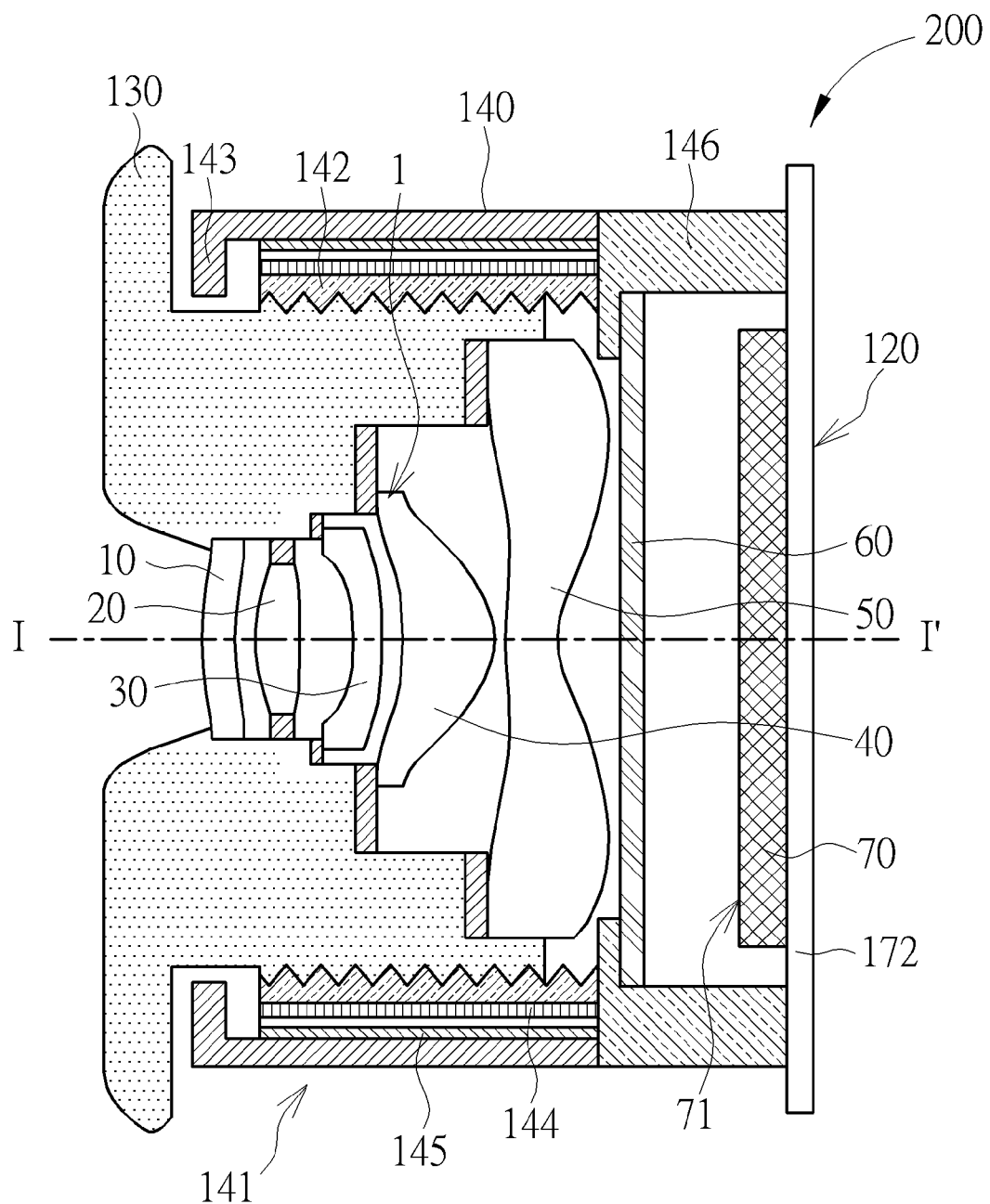
FIG. 21 illustrates a second preferred example of the portable electronic device with an optical imaging lens set of the present invention.

Please also refer to FIG. 21 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 60, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising:
   a first lens element with refractive power, having a convex first object-side surface facing toward said object side and a first image-side surface facing toward said image side, and said first image-side surface having a concave part in a vicinity of a circular periphery of said first lens element;
   an aperture stop;
   a second lens element with refractive power, having a second object-side surface facing toward said object side, and said second object-side surface having a convex part in a vicinity of a circular periphery of said second lens element;
   a third lens element with refractive power, having a third object-side surface facing toward said object side, and said third object-side surface having a concave part in a vicinity of a circular periphery of said third lens element;
   a fourth lens element with refractive power; and
   a fifth lens element with refractive power, having a fifth image-side surface facing toward said image side, and said fifth image-side surface having a concave part in a vicinity of said optical axis; wherein the fifth lens element is made of plastic and the optical imaging lens set exclusively has only five lens elements, and an air gap AG12 between said first lens element and said second lens element along said optical axis, an air gap AG34 between said third lens element and said fourth lens element along said optical axis and a thickness T4 of said fourth lens element along said optical axis satisfy a relationship $2.2 \leq T4/(AG12+AG34)$.

2. The optical imaging lens set of claim 1, wherein an air gap AG23 between said second lens element and said third lens element along said optical axis and an air gap AG45 between said fourth lens element and said fifth lens element along said optical axis satisfy a relationship $1.7 \leq AG23/(AG12+AG45)$.

3. The optical imaging lens set of claim 2, wherein the sum of all four air gaps AAG between each lens element from said first lens element to said fifth lens element along the optical axis and a thickness T1 of said first lens element along said optical axis satisfy a relationship $2.3 \leq AAG/T1$.

4. The optical imaging lens set of claim 2, wherein a total thickness ALT of said first lens element, said second lens element, said third lens element, said fourth lens element and said fifth lens element along said optical axis satisfy a relationship $ALT/T4 \leq 2.8$.

5. The optical imaging lens set of claim 1, wherein a thickness T1 of said first lens element along said optical axis and a thickness T2 of said second lens element along said optical axis satisfy a relationship $1 \leq T2/T1$.

6. The optical imaging lens set of claim 5, wherein an air gap AG23 between said second lens elements and said third lens element along said optical axis and a thickness T3 of said third lens element along said optical axis satisfy a relationship $1.5 \leq AG23/T3$.

7. The optical imaging lens set of claim 5, wherein a total thickness ALT of said first lens element, said second lens element, said third lens element, said fourth lens element and said fifth lens element along said optical axis and an air gap AG23 between said second lens element and said third lens element along said optical axis satisfy a relationship $ALT/AG23 \leq 5.5$.

8. The optical imaging lens set of claim 1, wherein an air gap AG12 between said first lens element and said second lens element along said optical axis, an air gap AG23 between said second lens element and said third lens element along said optical axis and an air gap AG45 between said fourth lens element and said fifth lens element along said optical satisfy a relationship $1.7 \leq AG23/(AG12+AG45)$.

9. The optical imaging lens set of claim 8, wherein a thickness T3 of said third lens element along said optical axis and a thickness T4 of said fourth lens element along said optical axis satisfy a relationship $3.3 \leq T4/T3$.

10. The optical imaging lens set of claim 8, wherein a thickness T2 of said second lens element along said optical axis and a thickness T3 of said third lens element along said optical axis satisfy a relationship $1.3 \leq T2/T3$.

11. The optical imaging lens set of claim 10, wherein an air gap AG34 between said third lens element and said fourth lens element along said optical axis satisfies a relationship $1.6 \leq T2/(AG12+AG34) \leq 2.5$.

12. The optical imaging lens set of claim 1, wherein a thickness T1 of said first lens element along said optical axis and a thickness T2 of said second lens element along said optical axis satisfy a relationship $1 \leq T2/T1$.

13. The optical imaging lens set of claim 12, wherein an air gap AG12 between said first lens element and said second lens element along said optical axis, an air gap AG23 between said second lens element and said third lens element along said optical axis and an air gap AG34 between said third lens element and said fourth lens element along said optical axis satisfy a relationship $1.6 \leq AG23/(AG12+AG34)$.

14. The optical imaging lens set of claim 13, wherein an air gap AG45 between said fourth lens element and said fifth lens element along said optical satisfies a relationship $1.9 \leq T2/(AG12+AG45) \leq 3.3$.

15. An electronic device, comprising:
    a case; and
    an image module disposed in said case and comprising:
        an optical imaging lens set of any one of claim 1;
        a barrel for the installation of said optical imaging lens set;
        a module housing unit for the installation of said barrel;
        a substrate for the installation of said module housing unit; and
        an image sensor disposed on the substrate and disposed at an image side of said optical imaging lens set.

* * * * *